US012639241B2

(12) United States Patent
Cao

(10) Patent No.: US 12,639,241 B2
(45) Date of Patent: May 26, 2026

(54) HOST, INFORMATION PROCESSING METHOD, ELECTRONIC SYSTEM, AND READABLE MEMORY MEDIUM

(71) Applicant: YANGTZE MEMORY TECHNOLOGIES CO., LTD., Wuhan (CN)

(72) Inventor: Kaiyao Cao, Wuhan (CN)

(73) Assignee: YANGTZE MEMORY TECHNOLOGIES CO., LTD., Wuhan (CN)

(*) Notice: Subject to any disclaimer, the term of this patent is extended or adjusted under 35 U.S.C. 154(b) by 0 days.

(21) Appl. No.: 18/238,756

(22) Filed: Aug. 28, 2023

(65) Prior Publication Data

US 2024/0385978 A1     Nov. 21, 2024

Related U.S. Application Data

(63) Continuation of application No. PCT/CN2023/094537, filed on May 16, 2023.

(51) Int. Cl.
*G06F 13/20* (2006.01)
*G06F 3/06* (2006.01)
*G06F 9/48* (2006.01)
*G06F 9/50* (2006.01)
*G06F 13/10* (2006.01)
*G06F 13/16* (2006.01)
*G06F 13/22* (2006.01)
*G06F 13/24* (2006.01)
(Continued)

(52) U.S. Cl.
CPC .......... *G06F 13/20* (2013.01); *G06F 2213/40* (2013.01)

(58) Field of Classification Search
CPC .......................... G06F 9/5077; G06F 12/1009
See application file for complete search history.

(56) References Cited

U.S. PATENT DOCUMENTS

2013/0132627 A1* 5/2013 Dong ...................... G06F 9/526
                                                    710/200
2015/0134857 A1  5/2015 Hahn et al.
(Continued)

FOREIGN PATENT DOCUMENTS

CN     106981883 A     7/2017
CN     108984327 A     12/2018
(Continued)

OTHER PUBLICATIONS

Supplementary European Search Report issued in corresponding European Application No. EP23923204.4, mailed on Jul. 3, 2025, 10 pages.

*Primary Examiner* — Getente A Yimer
(74) *Attorney, Agent, or Firm* — BAYES PLLC

(57) ABSTRACT

Examples of the present disclosure disclose a host, an information processing method, an electronic system, and the readable memory medium. Wherein the host includes: a processor; the processor includes: a first central processing unit (CPU) core bound with a first thread and a second CPU core bound with a second thread; wherein, the first CPU core is configured to: in response to control of the first thread, send an input/output (I/O) request to a memory device coupled to the host; the second CPU core is configured to: in response to the control of the second thread, receive feedback information which is related to the I/O request and sent by the memory device.

20 Claims, 14 Drawing Sheets

100

(51) Int. Cl.
    *G06F 13/366*     (2006.01)
    *G06F 15/167*     (2006.01)

(56)           References Cited

U.S. PATENT DOCUMENTS

| | | | |
|---|---|---|---|
| 2017/0286326 A1* | 10/2017 | Guim | ............... G06F 12/1009 |
| 2019/0179767 A1* | 6/2019 | Tsirkin | ............... G06F 9/5077 |
| 2021/0397487 A1* | 12/2021 | Khanna | ............... H04L 69/325 |
| 2022/0122650 A1* | 4/2022 | Eilert | .................. G11C 7/106 |
| 2023/0120600 A1 | 4/2023 | Benisty et al. | |
| 2023/0127112 A1* | 4/2023 | Tsirkin | ............... G06F 9/4881 |
| | | | 718/103 |

FOREIGN PATENT DOCUMENTS

| | | | |
|---|---|---|---|
| CN | 112667318 A | 4/2021 |
| CN | 113760789 A | 12/2021 |
| CN | 114443322 A | 5/2022 |
| CN | 114816701 A | 7/2022 |
| CN | 115080277 A | 9/2022 |
| KR | 20210148852 A | 12/2021 |
| WO | 2022021372 A1 | 2/2022 |

* cited by examiner

100

108 first processor 201 multi-core processor 2011

| CPU core 2011-1 | CPU core 2011-2 | • • • | CPU core 2011-N | peripheral interface 2012

| VFS layer |||
|---|---|---|
| VFS file system | Ext2 file system | Ext3 file system |
| Page Cache cache layer |||
| General Block layer |||
| IO scheduling layer |||
| Block device driver layer |||
| Block device layer |||

I/O request

| VFS layer |||
|---|---|---|
| VFS file system | Ext2 file system | Ext3 file system |
| Page Cache cache layer |||
| General Block layer |||
| IO scheduling layer |||
| Block device driver layer |||
| Block device layer |||

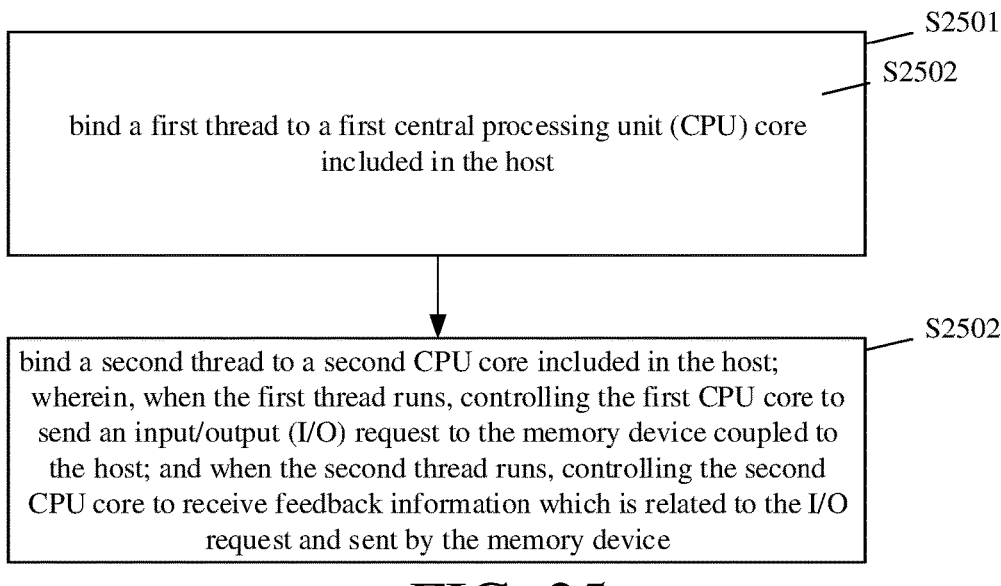

bind a first thread to a first central processing unit (CPU) core included in the host

S2501

S2502 bind a second thread to a second CPU core included in the host; wherein, when the first thread runs, controlling the first CPU core to send an input/output (I/O) request to the memory device coupled to the host; and when the second thread runs, controlling the second CPU core to receive feedback information which is related to the I/O request and sent by the memory device

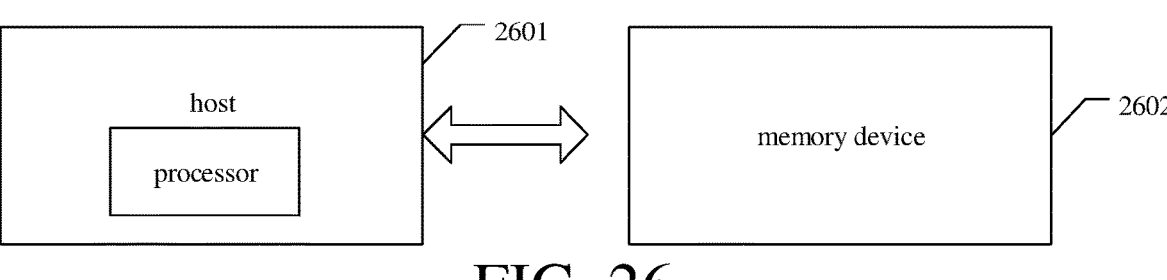

host processor

2601 memory device

HOST, INFORMATION PROCESSING METHOD, ELECTRONIC SYSTEM, AND READABLE MEMORY MEDIUM

CROSS-REFERENCE TO RELATED APPLICATIONS

This application is a continuation of International Application No. PCT/CN2023/094537, filed on May 16, 2023, which is incorporated herein by reference in its entirety.

TECHNICAL FIELD

The disclosure relates to a technical field of memory, and in particular to a host, an information processing method, an electronic system, and a readable memory medium.

BACKGROUND

At present, an electronic system may include a host and a memory device, which includes a memory system. A Central Processing Unit (CPU) core, which is included in the host, may send data to the memory device or receive feedback from the memory device. The data transmission mode adopted by the CPU core uses a large amount of lock protection, which results in a large lock overhead for the electronic system. the feedback reception mode adopted by the CPU core uses interrupt-context switching, which takes a lot of time to save and restore data. As a result, the time overhead of the electronic system is relatively large.

SUMMARY

According to one aspect of the present disclosure, a host is provided. The host may include a first central processing unit (CPU) core bound with a first thread and a second CPU core bound with a second thread. The first CPU core may be configured to, in response to control of the first thread, send an input/output (I/O) request to a memory device coupled to the host. The second CPU core may be configured to, in response to the control of the second thread, receive feedback information which is related to the I/O request and sent by the memory device.

In some implementations, the processor may further include a device interface. In some implementations, the device interface may include a host controller interface. In some implementations, the host controller interface may include an interrupt register. In some implementations, the second CPU core may be further configured to, in response to the control of the second thread, poll the interrupt register to receive the feedback information.

In some implementations, the second CPU core may be configured to, in response to the control of the second thread, periodically access the interrupt register at a preset time interval to determine whether the feedback information is received in the interrupt register. In some implementations, the second CPU core may be configured to, if the feedback information is received, obtain the feedback information from the interrupt register.

In some implementations the host may further include a memory. In some implementations, the memory may be configured to store a request command queue. In some implementations, the request command queue may include one or more request commands. In some implementations, the one or more request commands correspond to one or more I/O requests. In some implementations, the first CPU core may be configured to, in response to the control of the first thread, obtain the one or more request commands from the request command queue, and send the one or more request commands to the memory device.

In some implementations, the host controller interface may further include a doorbell register. In some implementations, the second CPU core may be further configured to access the doorbell register to determine the I/O request corresponding to the feedback information.

In some implementations, the first CPU core may be further configured to access the doorbell register. In some implementations, the first CPU core may be further configured to access the doorbell register, assign a transmission channel required for the I/O request in a ready state.

In some implementations, the access mode for the doorbell register may include a locked access mode. In some implementations, the locked access mode may include that the doorbell register is only accessed by the first CPU core or the second CPU core at a same time.

In some implementations, the I/O request may be generated by an application running on the processor. In some implementations, the I/O request may be converted by a device driver running on the processor into one or more request commands in a format supported by the memory device.

In some implementations, the device interface may further include a unified protocol circuit and an M-physical layer interface circuit. In some implementations, the unified protocol circuit and the M-physical layer interface circuit are coupled with the host controller interface. In some implementations, one or more of the unified protocol circuit and/or the M-physical layer interface circuit may be configured to send a request command to the memory device or receive the feedback information sent by the memory device. In some implementations, the request command may be generated based on the I/O request.

In some implementations, the memory device may include a Universal Flash Memory (UFS) device.

In some implementations, the operating system running on the host may include a Linux operating system.

In some implementations, the processor may include a plurality of CPU cores. In some implementations, a first CPU core may be any one of the plurality of CPU cores. In some implementations, a second CPU core may be any one of the plurality of CPU cores other than the first CPU core.

According to another aspect of the present disclosure, an information processing method for a host is provided. The method may include binding a first thread to a first CPU core included in the host. The method may include binding a second thread to a second CPU core included in the host. The method may include, when the first thread runs, controlling the first CPU core to send an I/O request to the memory device coupled to the host. The method may include, when the second thread runs, controlling the second CPU core to receive feedback information which is related to the I/O request and sent by the memory device.

In some implementations, when the second thread runs, the controlling the second CPU core to receive the feedback information which is related to the I/O request and sent by the memory device may include controlling the second CPU core to poll an interrupt register included in the host to receive the feedback information.

In the scheme described above, the controlling the second CPU core to poll an interrupt register included in the host to receive the feedback information may include periodically accessing the interrupt register at a preset time interval to determine whether the feedback information is received in the interrupt register. In some implementations, the method may include, if the feedback information is received, obtaining the feedback information from the interrupt register.

In some implementations, when the first thread runs, the controlling the first CPU core to send an I/O request to a memory device coupled to the host may include controlling the first CPU core to obtain one or more request commands from a request command queue stored in the memory of the host, and sending the one or more request commands to the memory device. In some implementations, the one or more request commands may correspond to one or more I/O requests.

In some implementations, the method may include, when the first thread runs, controlling the first CPU core to access the doorbell register included in the host. In some implementations, the method may further include, when the first thread runs, assigning a transmission channel required for the I/O request in a ready state. In some implementations, when the second thread runs, controlling the second CPU core to access the doorbell register to determine the I/O request corresponding to the feedback information.

In some implementations, the access mode for the doorbell register may include a locked access mode. In some implementations, the locked access mode may include that the doorbell register is only accessed by the first CPU core or the second CPU core at a same time.

According to a further aspect of the present disclosure, an electronic system is provided. The electronic system may include a host and a memory device coupled to the host. The host may include a processor. The processor may be configured to bind a first thread to a first CPU core included in the processor. The processor may be configured to bind a second thread to a second CPU core included in the processor. The processor may be configured to run the first thread, such that the first CPU core is controlled to send an I/O request to a memory device. The memory device may be configured to receive and process the I/O request; generate feedback information related to the I/O request. The memory device may be configured to send the feedback information to the host. The processor may be further configured to run the second thread, such that the second CPU core is controlled to receive the feedback information sent by the memory device.

In some implementations, the processor may further include a device interface. In some implementations, the device interface may include a host controller interface. In some implementations, the host controller interface may include an interrupt register. In some implementations, the second CPU core may be further configured to, in response to the control of the second thread, periodically send a first access command to the interrupt register at a preset time interval. the interrupt register is configured to: in response to the first access command, when receiving the feedback information sent by the memory device, send the feedback information to the second CPU core.

In some implementations, the host may further include a memory. In some implementations, the memory may be configured to store a request command queue, which includes one or more request commands corresponding to one or more I/O requests. In some implementations, the first CPU core may be further configured to, in response to the control of the first thread, send a second access command to the memory. In some implementations, the memory may be configured to, in response to the second access command, obtain the one or more request commands from the request command queue. In some implementations, the memory may be configured to send the one or more request commands to the first CPU core. In some implementations, the first CPU core may be further configured to send the one or more request commands to the memory device.

According to still another aspect of the present disclosure, a computer-readable memory medium having a computer program stored thereon, which when executed by a processor, implements the method according to any one of the foregoing aspects, may be provided.

Examples of the present disclosure provide a host, an information processing method, an electronic system, and a readable memory medium. The host may include a first CPU core bound with a first thread and a second CPU core bound with a second thread. The first CPU core may be configured to, in response to control of the first thread, send an I/O request to a memory device coupled to the host. The second CPU core may be configured to, in response to the control of the second thread, receive feedback information which is related to the I/O request and sent by the memory device. By binding the first thread to the first CPU core and the second thread to the second CPU core, and processing the I/O requests between the host and the memory device with two application-specific CPU cores, the exemplary host described below reduces a large amount of lock overhead.

BRIEF DESCRIPTION OF THE DRAWINGS

In the accompanying drawings, which are not necessarily drawn to scale, like reference numerals may describe similar components in the different views of drawings. The same numbers with different letter suffixes may represent different instances of a similar component. The accompanying drawings illustrate, by way of example and not limitation, various examples discussed in this document.

FIG. 25 shows a schematic flowchart of an information processing method for a host provided by an example of the present disclosure, according to some implementations of the present disclosure.

FIG. 26 shows a structural schematic diagram of an electronic system provided by an example of the present disclosure, according to some implementations of the present disclosure.

DETAILED DESCRIPTION

Figures 1, 2:
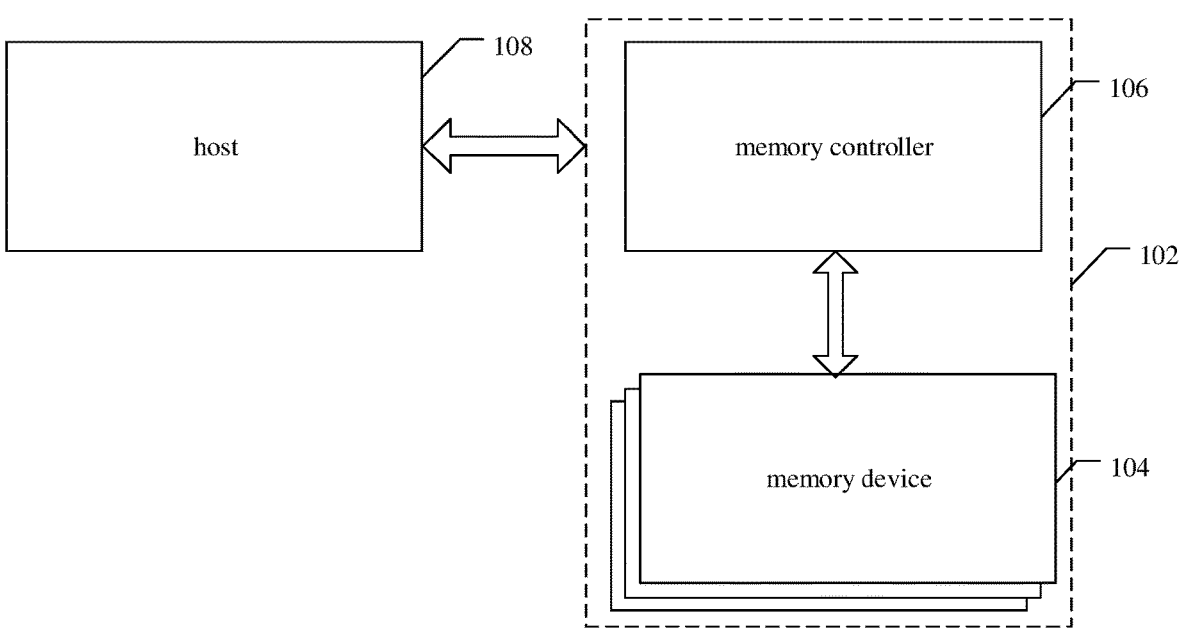
FIG. 1 shows a system block diagram of an example electronic device that includes a memory system, according to some implementations of the present disclosure.
FIG. 2 shows a structural example diagram of a host in the system shown in FIG. 1, according to some implementations of the present disclosure.

Various examples of the present disclosure are described in more detail below with reference to the accompanying drawings. Other examples that are variations of any disclosed example may be formed by differently configuring or arranging elements and features of the disclosed examples. Therefore, examples of the present disclosure are not limited to the examples set forth herein. Rather, the described examples are provided so that the disclosed examples will be thorough and complete, and will fully convey the scope of the disclosed examples to those skilled in the art to which the disclosed examples belong. It is to be noted that references to "an example," "another example," etc., do not necessarily refer to only one example, and that different references to any such phrase are not necessarily to the same example. It should be understood that although the terms "first," "second," "third," etc., may be herein to identify various elements, these elements should not be limited by these terms. These terms are to distinguish one element from another element having the same or similar name. Therefore, a first element in an example may also be referred as a second element or third element in another example without departing from the spirit and scope of the examples of the present disclosure.

The drawings are not necessarily drawn to scale, and in some instances the scale may have been exaggerated to clearly illustrate features of the examples. When an element is referred as being connected or coupled to another element, it should be understood that the former may be directly connected or coupled to the latter or electrically connected or coupled to the latter via one or more intervening elements therebetween. In addition, it should also be understood that when an element is referred as being "between" two elements, it may be the only element between the two elements, or one or more intervening elements may also be present.

The terminology herein is for the purpose of describing particular examples only and is not intended to be limiting of the present disclosure. As described herein, singular forms are intended to include plural forms unless the context clearly dictates otherwise. Unless otherwise stated or clearly understood as a singular form from the context, the articles "a" and/or "an" described in the examples of the present disclosure and the appended claims shall be collectively interpreted as meaning "one or more". It should be further understood that the terms "include", "comprising", "include" and "including" described in the examples of the present disclosure specify the presence of stated elements and do not exclude the presence or addition of one or more other elements. The term "and/or" described in the examples of the present disclosure includes any and all combinations of one or more of the associated listed items. Unless otherwise defined, all terms including technical and scientific terms described in the examples of the present disclosure have the same meanings as commonly understood by one of ordinary skill in the art to which the present disclosure belongs in view of the examples of the present disclosure. It should be further understood that, unless clearly defined by the examples of the present disclosure, terms such as those defined in commonly described dictionaries should be interpreted as having meanings consistent with their meanings in the context of the examples of the present disclosure and related technologies, and should not be interpreted in an idealized or overly formal way.

In the following description, numerous specific details are set forth in order to provide a thorough understanding of the disclosure, and the disclosure may be practiced without some or all of these specific details. In other instances, well known processing structures and/or processes are not described in detail so as not to unnecessarily obscure the present disclosure. It should also be understood that in some cases, unless stated otherwise, it will be apparent to a person skilled in the relevant art that features or elements described with respect to one example may be used alone or in combination with other features or elements of another example. Hereinafter, various examples of the present disclosure are described in detail with reference to the accompanying drawings. The following description focuses on details to facilitate understanding of examples of the present disclosure. Well-known technical details may be omitted so as not to obscure the features and aspects of the examples of the disclosure.

Examples of the present disclosure will be further described in detail below in conjunction with the accompanying drawings.

FIG. 1 shows a system block diagram of an example electronic device including a memory system. In FIG. 1, the electronic device may be a mobile phone, a desktop computer, a laptop computer, a tablet, a vehicle computer, a gaming console, a printer, a positioning device, a wearable electronic device, a smart sensor, a Virtual Reality (VR) device, an Augmented Reality (AR) device, or any other suitable electronic devices having memory system therein. As shown in FIG. 1, system 100 is a system in an electronic device, which may include a host 108 and a memory system 102, and the memory system is included in a memory device.

In some examples, as shown in FIG. 2, the host 108 may include a first processor 201 such as a CPU or a System-on-Chip (SoC), where the system on a chip may, e.g., be an Application Processor (AP). The first processor 201 may include a multi-core processor 2011 and a peripheral interface 2012 (also referred as a "device interface")). The multi-core processor 2011 may include a plurality of CPU cores (e.g., CPU core 2011-1 to CPU core 2011-N, where N is an integer greater than 1), where each of the CPU cores may include logic circuits (or modules) with logic operation and control capabilities. The peripheral interface 2012 is a channel for communicating with the memory system to realize the function of the host reading data from the memory system or writing data into the memory system by the host.

The host 108 also includes at least one operating system (OS) that may manage and control the functions and operations performed in the host 108. The OS may enable interoperability between a host 108 coupled to the memory system 102 and users who need and use the memory system 102. The OS may support functions and operations corresponding to the request of the user. Depending on whether the type of the host 102 is a removable host, the OS may be classified into a general-purpose operating system and a mobile operating system. The general-purpose operating system may include a personal operating system and an enterprise operating system. The personal operating system may include operating systems configured to support services for general purposes, e.g., such as Windows™ and Chrome™. The enterprise operating system may include an operating system dedicated to ensuring and supporting higher performance, e.g., such as Windows™ server, Linux, and Unix. The mobile operating system may refer to an operating system for mobility services or functions (e.g., a power saving function), and the mobile operating system may include an operating system, e.g., such as Android™, IOS™, and Windows Mobile™, etc. In some examples, the host 108 may include a plurality of Oss. Accordingly, host 108 may run a plurality of operating systems related to the memory system 102. In some other examples, the host 108 may convert the request of the user into one or more commands, and transmit the one or more commands to the memory system 102. As such, the memory system 102 may perform operations associated with the one or more commands. It is understood that the OS may be configured in the CPU core, e.g., a mobile electronic device including UFS may be applied in the Android platform, and the CPU core included in the mobile electronic device uses Linux.

The memory system 102 may be capable of operating or performing a specific function or performing internal various operations in response to a request from the host 108. In some examples, memory system 102 may be capable of storing data accessed by host 108. Memory system 102 may act as a primary memory system or a secondary memory system for host 108. The memory system 102 and the host 108 may be electrically connected and communicate according to corresponding protocols. The memory system 102 may be implemented and packaged into different types of terminal electronic products, including, e.g., Solid State Drives (SSD), Multimedia Cards (MMC), Embedded MMC (eMMC), Reduced Size MMC (RS-MMC), Micro MMC, Secure Digital (SD) cards, Mini SD, Micro SD, Universal Serial Bus (USB) memory devices, Universal Flash Memory (UFS) devices, Compact Flash (CF) cards, Smart Media (SM) cards and memory sticks, etc.

In some examples, memory system 102 may also be configured as part of a device, e.g., a computer, Ultra Mobile PC (UMPC), workstation, netbook, Personal Digital Assistant (PDA), portable computer, web tablet, tablet computer, wireless telephone, mobile phone, smart phone, e-book, portable multimedia players (PMP), portable game console, navigation system, black box, digital camera, Digital Multimedia Broadcasting (DMB) player, three-dimensional (3D) TV, smart TV, digital audio recorder, digital audio player, digital picture recorder, digital picture player, digital video recorder, digital video player, a memory device for configuring a data center, a device capable of transmitting and receiving information in a wireless environment, one of various electronic devices for configuring a home network, one of various electronic devices for configuring a computer network, one of various electronic devices for configuring a telematics network, a Radio Frequency Identification (RFID) device, or one of various components for configuring a computing system.

Referring back to FIG. 1, the memory system 102 may have one or more memory devices 104 and a memory controller 106. The memory controller 106 may respond to the request of the host 108, and in turn control the memory device 104. The memory controller 106 may read data from the memory device 104, and transmit the read data to the host 108. The memory controller 106 may also receive data to be stored from the host 108, and store the data to be stored into the memory device 104. That is, the memory controller 106 may be capable of controlling write (or program) operation, read operation, erase operation, background operation, etc., of the memory device 104.

Figure 3:
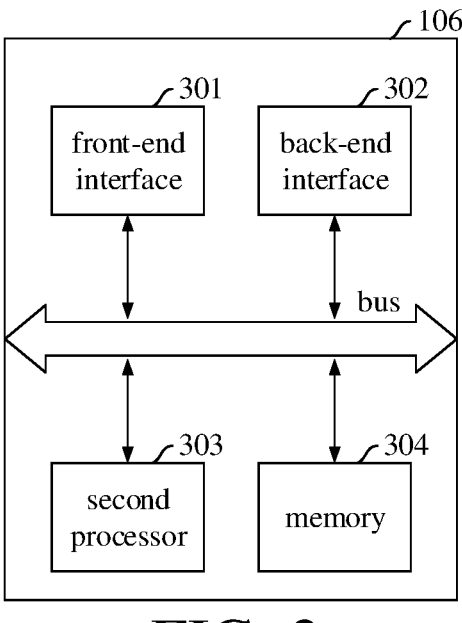
FIG. 3 shows a structural schematic diagram of a memory controller included in the memory system in the system shown in FIG. 1, according to some implementations of the present disclosure.

In some examples, as shown in FIG. 3, the memory controller 106 may include a front-end interface 301, a back-end interface 302, a processor 303, and a memory 304. The above-mentioned components 301, 302, 303, and 304 in the memory controller 106 may share transmission signals inside the memory controller 106 through an internal bus. In some examples, the front-end interface 301 may interface the host 108 with the memory system 102 in response to the protocol of the host 108, and the front-end interface 301 exchanges transmission commands and data operations between the host 108 and the memory system 102. The front-end interface 301 may process commands and data sent by the host 108, and may include at least one of Universal Serial Bus (USB), MultiMedia Card (MMC), Peripheral Component Interconnect Express (PCI-e), Small Computer System Interface (SCSI), Serial SCSI (SAS), Serial Advanced Technology Attachment (SATA), Parallel Advanced Technology Attachment (PATA), Small Computer System Interface (SCSI), Enhanced Small Disk Interface (ESDI), and Integrated Drive Electronics (IDE), just to name a few. In some examples, the front-end interface 301 may be a component in the memory system 102 for exchanging data with the host 108 and may be implemented by firmware, which may be referred as Host Interface Layer (HIL).

Back-end interface 302 may be an interface for commands and data transferred between memory controller 106 and memory device 104. This may enable memory controller 106 to control memory device 104 in response to requests communicated from host 108. The back-end interface 302 may generate control signals for controlling the memory device 104. In some examples, if the memory device 104 is a Not-And (NAND) flash memory, the back-end interface 302 may write data into the memory device 104 or read data from the memory device 104 under the control of the second processor 303. The back-end interface 302 may process commands and data between the memory controller 106 and the memory device 104, e.g., operations of a NAND flash interface, especially operations between the memory controller 106 and the memory device 104. According to an example, the back-end interface 302 may be implemented as a component for exchanging data with the memory device 104 through firmware, e.g., referred as Flash Interface Layer (FIL).

The second processor 303 may be implemented by a microprocessor or a CPU. The memory system 102 may include one or more second processors 303. The second processor 303 may control all the operations of the memory system 102. By way of example and not limitation, the second processor 303 may control a program operation or a read operation of the memory device 104 in response to a write request or a read request from the host 108. According to an example, the second processor 303 may use or run firmware to control all of the operations of the memory system 102. In some examples, firmware may be referred as a Flash Translation Layer (FTL). The FTL may operate as an interface between the host 108 and the memory device 104. The host 108 may transmit requests related to write operations and read operations to the memory device 104 through the FTL. For example, the memory controller 106 may use the second processor 303 when performing an operation requested from the host 108 in the memory device 104. A second processor 303 coupled to the memory device 104 may process instructions or commands related to commands from the host 108. The memory controller 106 may perform a foreground operation such as a command operation corresponding to a command input from the host 108, e.g., a program operation corresponding to a write command, a read operation corresponding to a read command, and an erase/drop operation corresponds to an erase/drop command, and a parameter set operation corresponds to a set parameter command or a set feature command with a set command.

For another example, the memory controller 106 may perform background operations on the memory device 104 through the second processor 303. By way of example and not limitation, these background operations may include a Garbage Collection (GC) operation, a Wear Leveling (WL) operation, a mapping clear operation, and a bad block management operation that checks or searches for bad blocks. The garbage collection operation may include an operation of copying and processing data stored in a certain memory block in the memory device 104 (the memory device shown in FIG. 4) to another memory block. The wear leveling operation may include an operation of exchanging and processing stored data among memory blocks MEMORY BLOCK<0, 1, 2, . . . > of the memory device 104. The mapping clear operation may include an operation of storing mapping data stored in the memory controller 106 into memory blocks MEMORYBLOCK<0, 1, 2, . . . > of the memory device 104. The bad block management operation may include an operation of checking and processing bad blocks in memory blocks MEMORY BLOCK<0, 1, 2, . . . > of the memory device 104. The memory controller 106 may respond to an operation of accessing memory blocks MEMORY BLOCK<0, 1, 2, . . . > of the memory device 104. The operation of accessing memory blocks MEMORY BLOCK<0, 1, 2, . . . > of the memory device 104 may include performing a foreground operation or background operation on memory blocks MEMORY BLOCK<0, 1, 2, . . . > of the memory device 104.

The memory 304 may include a working memory of the memory controller 106 and may be configured to store data for driving the memory controller 106. In some examples, when the memory controller 106 controls the memory device 104 in response to a request from the host 108, the memory 304 may store firmware driven by the second processor 303 and data (e.g., metadata) used to drive the firmware. Memory 304 may also include a buffer of memory controller 106. The buffer may be configured to temporarily store write data transferred from host 108 into memory device 104 and read data transferred from memory device 104 to host 108. Memory 304 may include program memory, data memory, write buffer/cache, read buffer/cache, data buffer/cache, and mapping buffer/cache for storing write data and read data. Memory 304 may be implemented by volatile memory. Memory 304 may be implemented by Static Random Access Memory (SRAM), Dynamic Random Access Memory (DRAM), or both.

Although FIG. 3 shows memory 304 being included in memory controller 106, the present disclosure is not limited thereto. Instead, in some implementations, the memory 304 may be included external to the memory controller 106, and the memory controller 106 may input and output data to and from the memory 304 through a separate memory interface (not shown).

Referring back to FIG. 1, memory device 104 may include a non-volatile memory device that may retain data stored therein even when it is not supplied with power. The memory device 104 may store data provided from the host 108 through a write operation. The memory device 104 may also provide the stored data to the host 108 through a read operation. In an example of the present disclosure, memory device 104 may be any memory disclosed, e.g., a volatile memory device such as DRAM and SRAM, or a non-volatile memory device, e.g., such as read-only memory (ROM), Mask ROM (MROM), Programmable ROM (PROM), Erasable and Programmable ROM (EPROM), Electrically Erasable and Programmable ROM (EEPROM), Ferroelectric RAM (FRAM), Phase Change RAM (PRAM), Magnetoresistive RAM (MRAM), Resistive RAM (RRAM or ReRAM) and Flash memory (e.g. 3D NAND Flash).

Figure 4:
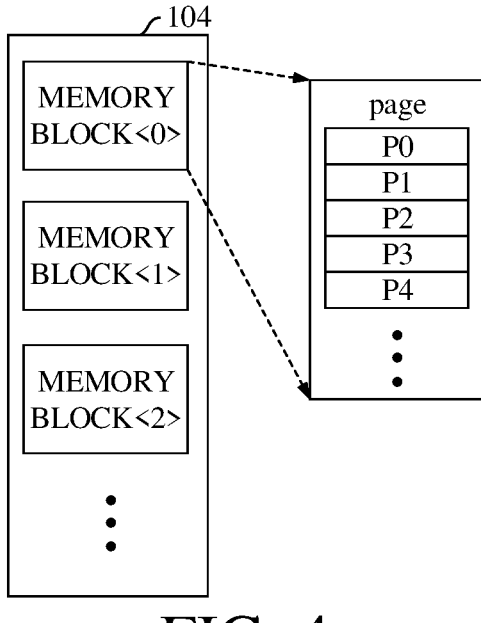
FIG. 4 shows a structural schematic diagram of a memory device included in a memory system, according to some implementations of the present disclosure.

As shown in FIG. 4, the memory device 104 may include a plurality of memory blocks MEMORY BLOCK<0, 1, 2, . . . >. Each of memory blocks may include a plurality of pages P<0, 1, 2, 3, 4, . . . >. Also, although not shown in the drawings, each of the pages P<0, 1, 2, 3, 4, . . . > may include a plurality of memory cells. According to the number of bits that may be stored or represented in a single memory cell, memory cells may be classified into any one of different types of memory blocks, e.g., such as Single-Level Cell (SLC) memory blocks and Multi-Level Cell (MLC) memory blocks. Here, the SLC memory block may include a plurality of pages implemented by memory cells each storing one bit of data. An SLC memory block may have high performance of an I/O operation and high endurance. An MLC memory block may include a plurality of pages implemented by memory cells each storing a plurality of bits of data (e.g., two or more bits). Compared with a SLC memory block, a MLC memory block may have larger memory capacity for a same space. In terms of memory capacity, MLC memory blocks may be highly integrated. In an example, the memory device 104 may be implemented with a memory block such as a Double-Level Cell (DLC) memory block, a Trinary-Level Cell (TLC) memory block, a Quad-Level Cell (QLC) memory block, or memory block composed of the types of level cell described above. An MLC memory block may include a plurality of pages implemented by memory cells each capable of storing 2 bits of data. A TLC memory block may include a plurality of pages implemented by memory cells each capable of storing 3 bits of data. A QLC memory block may include a plurality of pages implemented by memory cells each capable of storing 4 bits of data. In other examples, the memory device 104 may include memory blocks composed of memory cells each capable of storing 5 or more bits of data.

Figure 5:
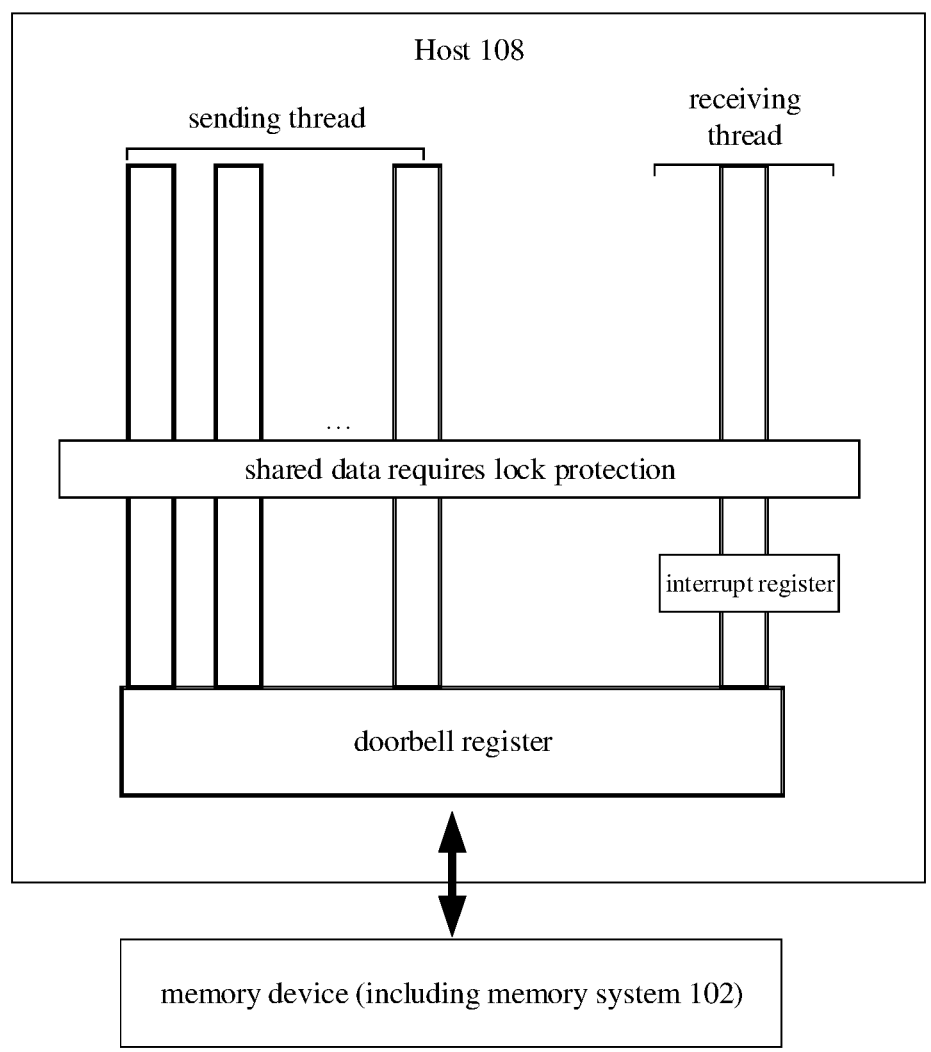
FIG. 5 shows a schematic diagram of the processing flow of the host sending an I/O request to the memory device and receiving feedback for the I/O request from the memory device, according to some implementations of the present disclosure.

Referring to FIG. 5, based on the foregoing example electronic device system that includes a memory system, a schematic diagram of interaction between a host and a memory system is shown. In FIG. 5, two processes are illustrated: 1) the process of the host sending an I/O request to the memory system through a sending thread (e.g., a sending kernel thread), and 2) the process of the host receiving data related to the I/O request fed back by the memory system to the host through the receiving thread (e.g., the receiving kernel thread).

In the former process 1), the host may employ a plurality of sending kernel threads to send I/O requests to the memory system through doorbell registers, where sending each of kernel threads uses an undesirable amount of lock protection to protect shared data at runtime. This may cause a large amount of lock overhead, and the locking and unlocking process may occur over a long duration. Therefore, the efficiency of accessing the memory system may be limited.

In the latter process 2), the host may receive data related to the I/O request fed back by the memory system through the interrupt register and the doorbell register. In this process, the interrupt mechanism employed by the operating system of the host is implemented by the way of interrupt-context switching. This receiving method takes a large amount of time to process operations, e.g., such as saving and restoring registers and memory page tables, updating kernel-related data structures, etc. This may cause undesirable system overhead.

Since the operating system of the host manages the peripherals (e.g., memory system, memory devices, etc.) connected to the host, and because the speed of the peripheral is lower than the operating speed of the first processor of the host, it may not be possible for the first processor of the host to monitor the status of the peripherals all the time. Thus, an interrupt mechanism is introduced. The interrupt mechanism may be understood according to the following description. For instance, when a peripheral identifies an upcoming peripheral-related event (e.g., reading or writing) in the operating system, the peripheral may actively notify the operating system. In other words, the peripheral may interrupt the normal execution between the operating system and the application (APP) included in the host, to complete the peripheral-related processing, and then resume the normal execution between the operating system and the APP. In the interrupt process described above, interrupt-context switching may be applied. Interrupt-context switching may include interrupting the normal execution between the operating system and the APP included in the host. As described above, the operating system may be allowed to complete the peripheral-related processing, which is a non-limiting example of interrupt-context switching. In another non-limiting example, interrupt-context switching may include a resumption of the normal execution between the operating system and the APP included in the host after the operating system completing the related processing of the peripheral. Interrupt-context switching uses an undesirable amount of time to process operations, e.g., such as saving and restoring registers and memory page tables, updating kernel-related data structures, etc., which may result in undesirable system overhead.

To overcome these and other challenges, the present disclosure provides an exemplary host, and through binding the first thread and the second thread (e.g., sending kernel thread and receiving thread), respectively, on the two CPU cores of the host's processor to use a dedicated sending kernel thread, which sends an I/O request, and to use a dedicated receiving thread, which receives the feedback value of the I/O request, the system overhead may be reduced.

Figure 6:
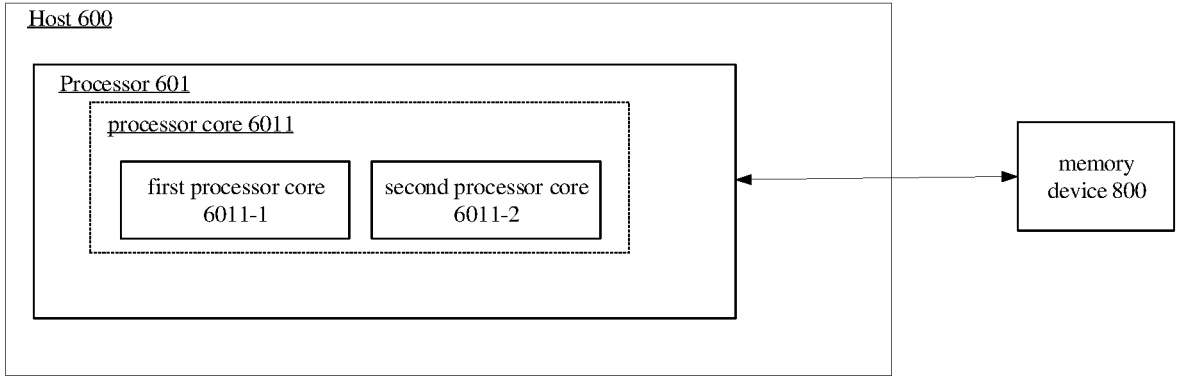
FIG. 6 shows a first structural schematic diagram of a host provided by an example of the present disclosure, according to some implementations of the present disclosure.

As shown in FIG. 6, a structural schematic diagram of a host provided by an example of the present disclosure is provided. In some examples, host 600 may include a processor 601, which may include a first CPU core 6011-1 bound with a first thread and a second CPU core 6011-2 bound with a second thread. In some implementations, the first CPU core 6011-1 may be configured to, in response to control of the first thread, send an I/O request to a memory device coupled to the host. In some implementations, the second CPU core 6011-2 may be configured to, in response to the control of the second thread, receive feedback information which is related to the I/O request and sent by the memory device 800.

By way of example and not limitation, the operating system of the host 600 may include a Linux operating system. In other words, the processor 601 may run the Linux operating system, in this example, the Linux operating system is an interactive system developed from UNIX, which is the first layer of software running on the host 600, and is mainly responsible for the distribution and control of all hardware included in the host. It also provides services for the running of upper-layer software (e.g., system software and application software). In the actual application process for various devices, e.g., such as smart phones, cars, supercomputers, household appliances, home desktops, enterprise servers, etc., the Linux operating system is widely used. In some examples, the memory device may include, e.g., a UFS device.

Figure 7:
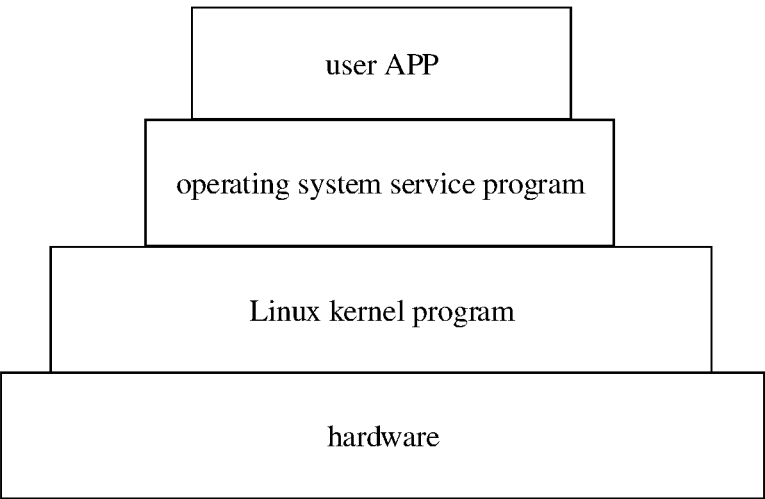
FIG. 7 shows a schematic diagram of the logical structure of a Linux-based operating system provided in an example of the present disclosure, according to some implementations of the present disclosure.
Figure 8:
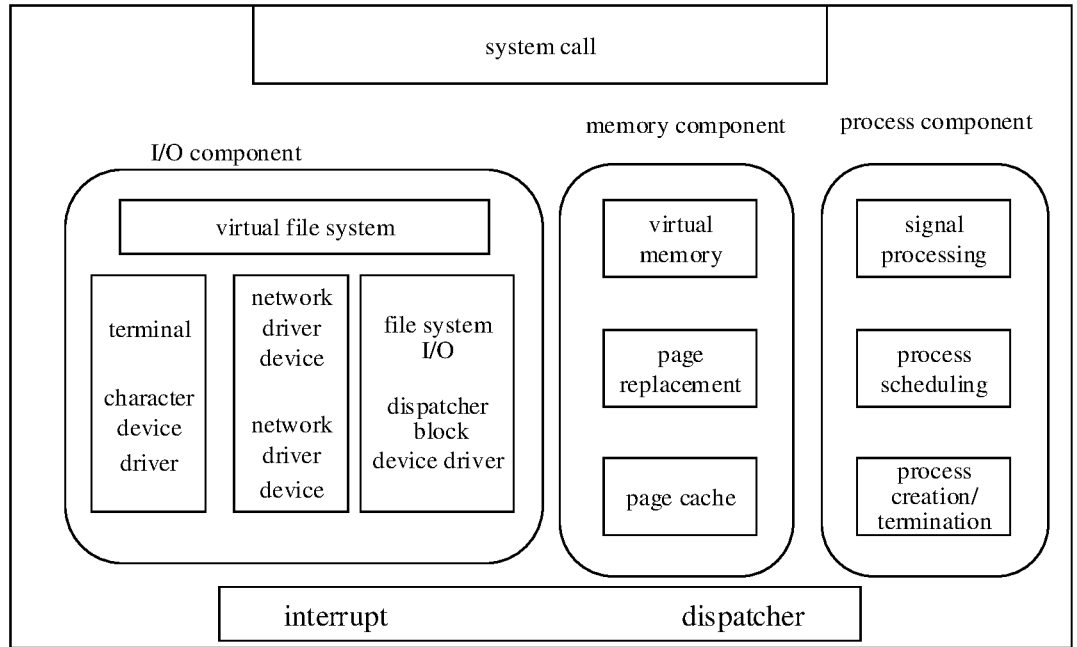
FIG. 8 shows a schematic diagram of the structure of the Linux kernel provided in an example of the present disclosure, according to some implementations of the present disclosure.

For an understanding the Linux operating system, reference may be made to FIGS. 7 and 8. For example, FIG. 7 shows a structural schematic diagram including a Linux operating system, and FIG. 8 shows a structural schematic diagram of a kernel of a Linux operating system.

Referring to FIG. 7, a complete Linux operating system mainly has four parts, e.g., 1) hardware, 2) a Linux-kernel program, 3) an operating-system service program, and 4) a user APP. The user APP mainly refers to those word-processing programs, Internet-browser programs, or APPs developed by users themselves (e.g., Taobao, Alipay, etc.). Operating-system service programs mainly refer to programs that provide services to users as part of the functions of the operating system. On the Linux operating system, these programs include system programs such as shell command parsing and Linux kernel programming interface. The Linux-kernel program is mainly configured for abstraction and access scheduling of hardware resources. Hardware includes, but is not limited to, e.g., CPU, memory, hard disk, memory device (or peripherals), etc.

An example of the Linux-kernel structure is shown as FIG. 8. The Linux kernel resides in a hardware memory, and its main functions include I/O interaction, memory management and control of CPU access. FIG. 8 also includes an interrupt and a scheduler. The interrupt is one way for the Linux operating system to interact with peripherals. The scheduler functions when an interrupt occurs. The low-level code stops the process that is running, saves its state in the kernel process structure, and starts the driver. Process scheduling also happens when the kernel completes some operations and starts a user process. The scheduler in FIG. 8 may include a dispatcher. Note that the scheduler in FIG. 8 here is a dispatcher instead of scheduler. While there is a difference between the two, both of scheduler and dispatcher are concepts related to scheduling of process (or thread). The difference is that the scheduler will randomly select a process from several processes, while the dispatcher will assign a CPU to the process selected by the dispatcher.

As shown in FIG. 8, the Linux kernel is divided into three parts: I/O component, memory component, and process component.

Among them, the I/O component includes all of the kernel parts that are responsible for interacting with peripherals and performing network and memory I/O operations. From the structural diagram of the Linux kernel shown in FIG. 8, the I/O components include one or more of the following. For instance, the I/O components may include a highest-level virtual file system (VFS), which means that no matter whether a file comes from memory or disk (or other memory devices), the file may be processed by the virtual file system first. The I/O components may include the underlying character device driver structure, block device driver structure, and network driver structure. The character device driver structure may include terminals (e.g., such as keyboards, printers, etc.) that transmit in units of characters and character device drivers (programs) that drives these terminals. The block device driver structure may include the file system, I/O dispatcher, and block (BLOCK) device driver (program). The network driver structure may include the Socket network protocol and network driver device.

Here, the file system is the system configured by Linux to specify files on memory devices (e.g., such as disks, NAND flash, etc.) or partitions, which provides a mapping conversion of a layer of files to the physical block layer of the memory device, e.g., a system for organizing files on the memory device. The I/O dispatcher may refer to a program or structure that performs some scheduling processing on the I/O requests provided by the file system. The main difference between the character device driver and block device driver is whether random access is allowed. For instance, the character device driver may not be accessed randomly, but may be read and written sequentially in units of byte streams. The block device driver may be accessed randomly in units of fixed-size blocks. The network driver device here is not an independent drive device. Instead, it may be a character device, but the processing mechanisms of the two are different. The socket network protocol may include, e.g., TCP/IP, UDP, etc.

The program is loaded into the memory component and executed by the CPU. In the process of loading the program, virtual memory, page replacement and page cache, etc., may be involved.

The process component may be responsible for the creation, termination, and scheduling of the process (e.g., the process of assigning the process to the corresponding CPU). The Linux kernel takes processes and threads as runnable entities, and adopts a unified scheduling strategy for scheduling.

From the perspective of the Linux kernel shown in FIG. 8, the top layer of the Linux kernel structure is a system calling interface. All of system calls pass through this system calling interface. When a system call is made, the system call passes the I/O request of the application running in the user mode to the Linux kernel running in the kernel mode. After that, the Linux kernel calls the corresponding kernel function to complete the required processing, and returns the processing result to the application.

For the Linux operating system, Linux is a multi-programming system, and there are mutually independent processes running simultaneously on the Linux operating system. Each process independently uses a set of dedicated computational resources and runs independently. The Linux operating system achieves multi-tasking through running these processes in turn at short intervals. This short time interval is referred as a time slice. Here, the way of running processes in turn is referred as process scheduling, and the program that completes this process scheduling is referred as a scheduling program. Each process is exclusive to the processor 601 at runtime. Because the cost of switching between processes is high, and the creation speed is slow and consumes a large number of computational resources, the use of threads is generated. In some examples, a process may include at least one thread. A thread may be an execution path of a process, and is the smallest unit of program execution, e.g., the basic unit of processor core scheduling.

In the operating system, as compared to a process independently owning various resources, a thread does not monopolize additional resources except the resources for execution (e.g., such as program counter, register, and stack of a CPU cores, etc.). Each thread in a same process shares all resources in the process. For a thread, according to whether the dispatcher of the thread is inside the Linux kernel or outside the Linux kernel, a thread may be divided into: User Level Thread (ULT) and Kernel Level Thread (KLT), where the dispatcher of the ULT is outside the Linux kernel; and the dispatcher of the KLT is inside the Linux kernel. The ULT may be a thread created through a thread library in the user space, and the creation, scheduling, destruction, and communication of the thread are all completed in the user space. A Linux kernel is not aware of an ULT, nor does it directly schedule an ULT. The scheduling object of the Linux kernel is still a process. That is, the Linux kernel does not assign resources for ULT, and ULT only competes for resources in the same process. In this case, if a certain ULT is blocked in the Linux kernel, it will cause all other threads in the same process to be blocked, and the concurrency of the ULT to be limited.

Based on this, the KLT is created in the Linux kernel, and the Linux kernel may be aware and manipulate the KLT through the data structure included in the KLT. Thus, the Linux kernel may implement concurrency among ULTs in the same process through the KLT.

Figures 9, 10:
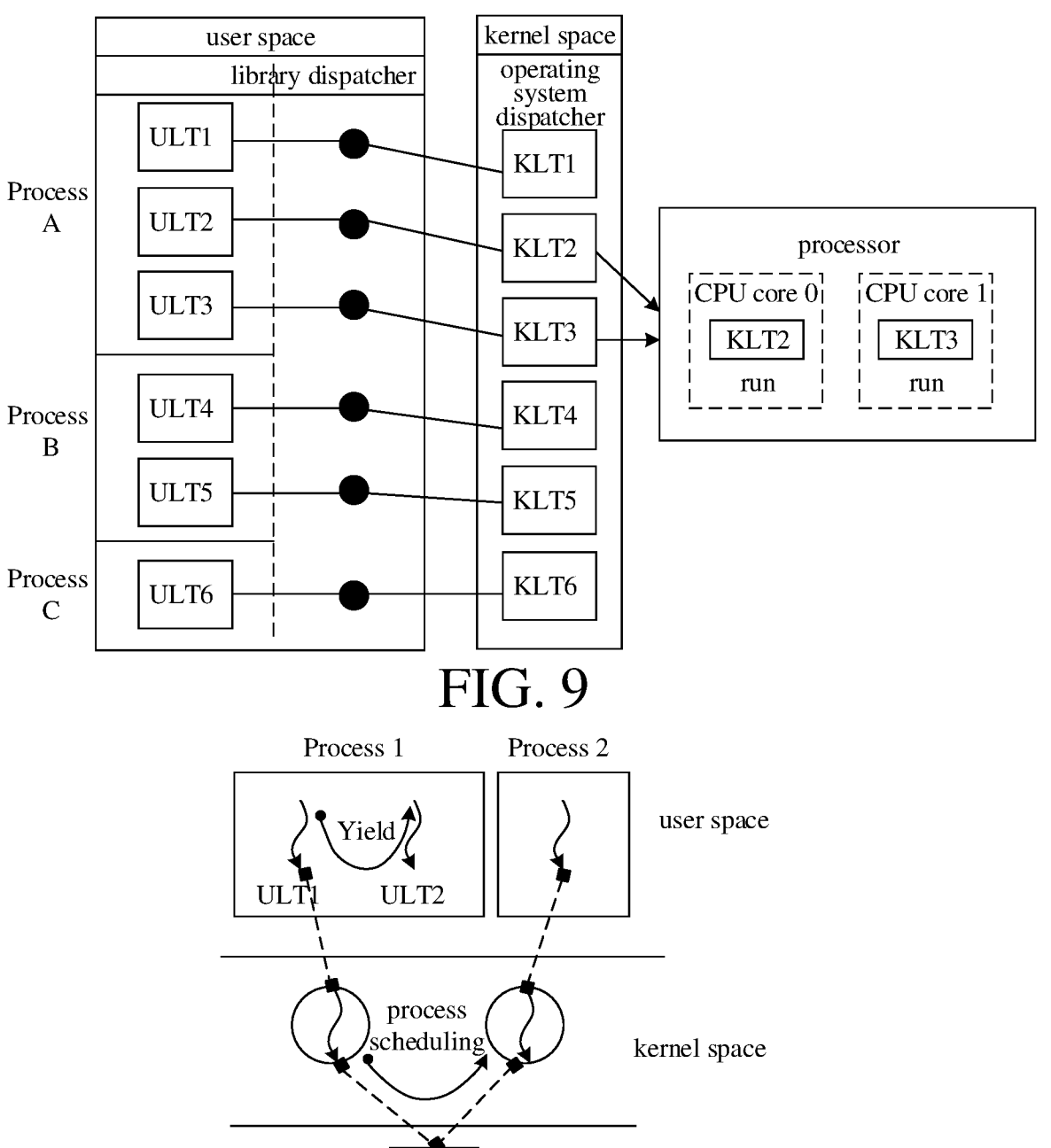
FIG. 9 shows a schematic diagram of a mapping relationship between a user thread and a kernel thread in an example of the present disclosure, according to some implementations of the present disclosure.
FIG. 10 shows a schematic diagram of scheduling between processes when a user thread is not mapped to a kernel thread provided by an example of the present disclosure, according to some implementations of the present disclosure.

FIG. 9 shows the mapping relationship between ULT and KLT in the Linux operating system, according to some implementations of the present disclosure. As shown in FIG. 9, in the Linux operating system, a one-to-one mapping relationship may be employed between ULT and KLT. In other words, one ULT is mapped to one KLT, and the operation of the ULT may rely on the KLT. That is, the operating system dispatcher included in the Linux kernel may assign the KLT mapped with the ULT to the corresponding CPU core for running. As shown in FIG. 9, it is assumed that the processing includes CPU core 0 and CPU core 1; three processes of process A, process B, and process C are created in user space. Here, process A includes three user threads ULT1 to ULT3; process B includes two user threads ULT4 and ULT5; and process C includes one user thread ULT6. In the kernel space, one ULT corresponds to one KLT. For instance, ULT1 to ULT6 correspond to KLT1 to KLT6, respectively. In this case, the processor may simultaneously run two kernel threads mapped with user threads, e.g., run KLT2 on CPU core 0, and run KLT3 on CPU core 1. Here, the user space may refer to the space that may be operated by the user. For example, both of the user APP and the operating system service program (layer) shown in FIG. 7 belong to the user space. The kernel space may refer to a space that may not be operated by the user, and is completed by the Linux kernel. For instance, the Linux kernel program (layer) shown in FIG. 7 belongs to the kernel space.

By adopting the aforementioned way of mapping described above, the Linux kernel may be aware and manipulate KLT through the data structure included in the KLT, and the Linux kernel may further implement the concurrency among ULTs in the same process through the KLT.

Figures 11, 12:
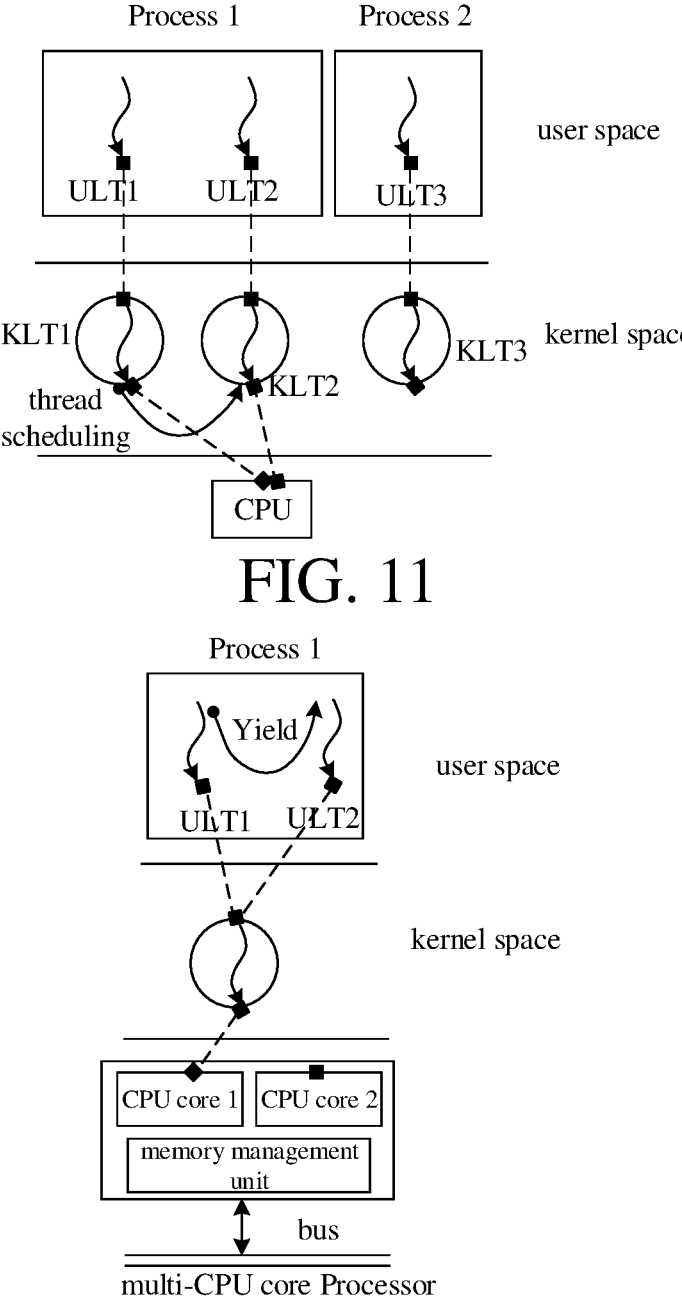
FIG. 11 shows a schematic diagram of scheduling between threads when a user thread is mapped to a kernel thread provided by an example of the present disclosure, according to some implementations of the present disclosure.
FIG. 12 shows a schematic diagram of scheduling of threads in a same process running on a same CPU core provided by an example of the present disclosure, according to some implementations of the present disclosure.

For example, FIG. 10 shows an ULT calling relationship diagram without including KLT, and FIG. 11 shows an ULT calling relationship diagram with including KLT. As shown in FIG. 10, ULT1 of process 1 will send a data download request to the website through the network card, and the network card is driven and managed by the operating system. Therefore, ULT1 issuing the data download request (GetData) may be completed by entering the Linux kernel with the help of a system call. When waiting for a network connection, the operating system will control the CPU to switch to process 2 instead of switching to ULT2 of process 1. The reason is that the operating system may not be aware the existence of ULT2 (e.g., the information of the thread control block (TCB) corresponding to ULT is in the user space), and may only call a schedule function to complete the process switching. Therefore, if a ULT is blocked in the Linux kernel, all ULTs of this process will be blocked, which limits the concurrency of ULTs.

As shown in FIG. 11, KLT is created in the Linux kernel. Information of KLT, e.g., such as TCB, is created in the Linux kernel. The Linux kernel may be aware and manipulate KLT through these data structures to achieve concurrency among ULTs in the same process. That is, when there is no KLT, the Linux kernel may perform operations including switching among processes, as shown in FIG. 10. When there is a KLT, the Linux kernel may switch among ULTs in the same process, as shown in FIG. 11. The creation of KLT in the Linux kernel implements the concurrency among ULTs.

In some examples, a KLT is more suitable for a multi-CPU core processor than a process for the following reasons, described below in connection with FIGS. 12-14.

For example, if there are two ULTs, as shown in FIG. 12, a process 1 includes two threads ULT1 and ULT2. Since the operating system may not be aware ULT, it may not schedule two ULTs, and may only work in one CPU core (such as CPU core 1), while the other CPU core (such as CPU core 2) is always idle. A yield function may be configured to save the stack of the thread executed by the current CPU core, and take out the stack pointer of the thread to be executed, and assign it to the register to start execution. The yield function is an important concept in concurrent programming. The memory management unit and the bus shown in FIG. 12 may not be limited in the present disclosure, and any bus and memory management unit that may support the technical solution of the present disclosure may be used.

Figure 13:
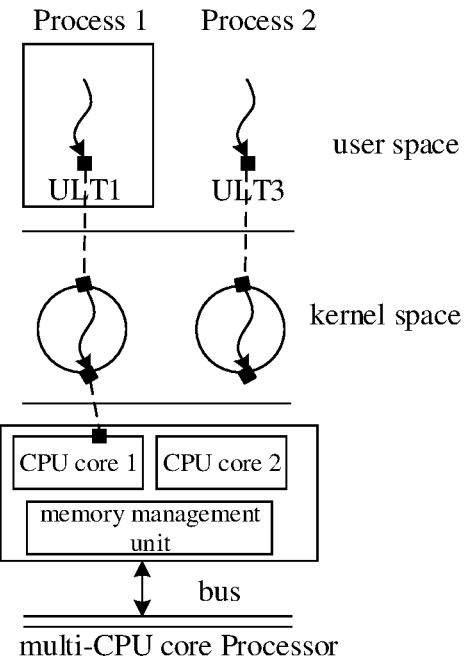
FIG. 13 shows a schematic diagram of scheduling of different processes running on different CPU cores provided by an example of the present disclosure, according to some implementations of the present disclosure.

If there are two processes, as shown in FIG. 13, process 1 may include ULT1, and process 2 may include ULT3. In this case, the Linux operating system may schedule and run two processes on two CPU cores, respectively. Although it may seem that the above processes may be performed in parallel, the memory resources of multi-CPU core processors are shared, which makes it impossible to check mapping tables of two processes at the same time. Therefore the two processes are not in parallel but are concurrent. This does not take advantage of the multi-CPU core processor.

Figure 14:
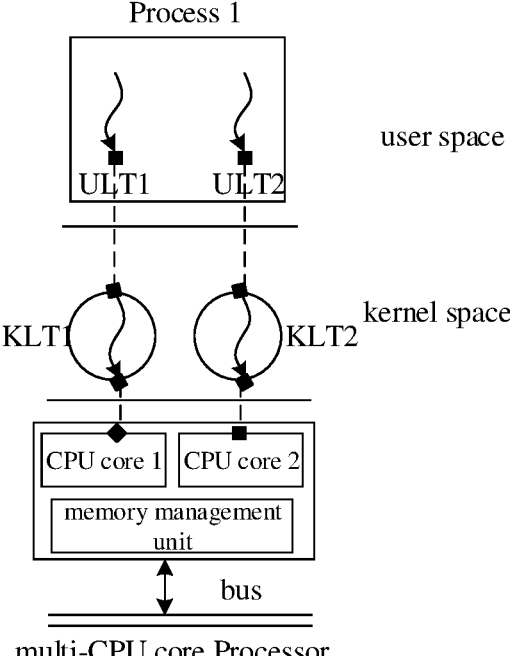
FIG. 14 shows a schematic diagram of scheduling of threads in a same process running on different CPU cores provided by an example of the present disclosure, according to some implementations of the present disclosure.

If there are two ULTs, as shown FIG. 14, a process 1 includes two threads ULT1 and ULT2, and each of ULTs corresponds to a KLT. Since KLT is created in the Linux kernel, the Linux operating system may schedule KLT. Because threads in the same process may share memory resources, there is no bottleneck for process. Thus, the hardware processing speed is accelerated and parallelism is achieved.

For multi-CPU core processors, when the KLT in the Linux kernel is scheduled, which CPU core it is assigned to run on is determined by the scheduling algorithm in the scheduler (such as a dispatcher) in the Linux kernel, and the CPU core to which a KLT is assigned is not fixed. Furthermore, since ULT is an execution unit in a process, it may run in parallel with other ULTs in the same process by a plurality of KLTs in different CPU cores. Still further, because ULTs share resources of a same process, e.g., such as memory resources, address-space resources, and open file resources, etc., mechanisms such as mutual exclusion, locking, and serialization among KLTs may ensure the consistency of shared data (such as global data) and data synchronization. In other words, when a plurality of KLTs are assigned to a plurality of CPU cores to run, in order to prevent KLTs on a plurality of CPU cores from accessing global data at the same time, when a KLT on a certain CPU core accesses global data, additional lock protection may be performed to ensure that the KLT on this CPU core may access the global data, and other CPU cores may not access all the data. Therefore, a technical problem (as shown in FIG. 5) may arise when a plurality of KLTs are used. Consequently, a large amount of lock protection needs to be added, which results in a large amount of lock overhead.

To overcome these and other challenges, the present disclosure provides an exemplary host as shown in FIG. 6, which binds the first thread to the first CPU core to use a dedicated sending kernel thread to send I/O requests. Moreover, the host of FIG. 6 may bind the second thread to the second CPU core to use a dedicated receiving thread to receive I/O request feedback value to reduce the lock overhead required for shared global data usage. Both of the first CPU core and the second CPU core may be included in the processor core 6011. In other words, the processor 601 shown in FIG. 6 may be the first processor 201 described above, which may be a processor including multiple CPU cores. Based on this, in some examples, the first CPU core and the second CPU core may refer to two of the plurality of CPU cores described above, and the first CPU core may be any one of the plurality of CPU cores. The second CPU core may be any CPU core among the plurality of CPU cores other than the first CPU core. The first thread described herein may be a sending kernel thread in the Linux kernel, and the second thread described herein may be a receiving kernel thread in the Linux kernel.

Binding the first thread to the first CPU core may mean that the first CPU core is dedicated to processing the first thread, and the first thread is only assigned to run on the first CPU core. In other words, the first CPU core is only controlled by the first thread. Similarly, binding the second thread to the second CPU core may mean that the second CPU core is dedicated to process the second thread, and the second thread is only assigned to run on the second CPU core. Binding a kernel thread to run on a dedicated CPU core may reduce the number of first threads (e.g., such as sending kernel threads) and second threads. This may reduce the number of lock protections used for global data, which may reduce lock overhead and the time overhead required for lock protection.

In some examples, the I/O request may be generated by an APP running on the processor, and the I/O request may be converted by a device driver running on the processor into one or more request commands in a format supported by the memory device.

That is to say, the I/O request may be generated by the APP; and, by the device driver, the I/O request may be converted into one or more request commands in a format supported by the memory device. The one or more request commands may be sent to the memory device. Here, he device driver may refer to the block device driver shown in FIG. 8, for example.

To illustrate the way in which the I/O request is transmitted from the APP to the device driver, a Linux-based memory system is taken as a non-limiting example.

Figures 15, 16:
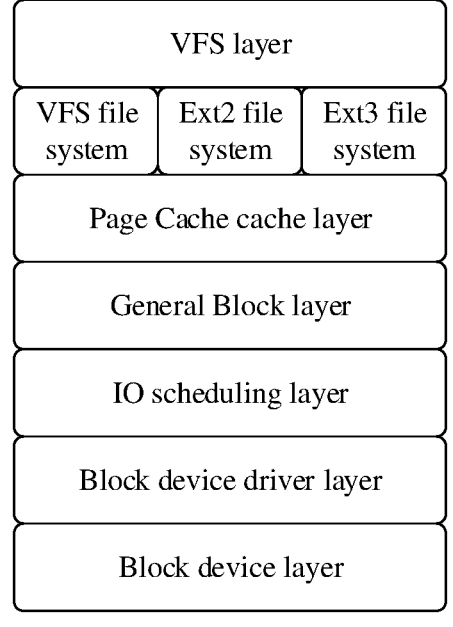
FIG. 15 shows a structural schematic diagram of a Linux-based memory system provided by an example of the present disclosure, according to some implementations of the present disclosure.
FIGS. 16-20 show the interactive relationship between layers in the Linux-based memory system provided by the examples of the present disclosure, according to some implementations of the present disclosure.

Referring to FIG. 15, the Linux-based memory system may include, e.g., a VFS layer, a file-system layer, a Page-Cache layer, a general Block layer, an I/O scheduling layer, a Block device driver layer, and/or a Block device layer, just to name a few. An example of the interaction relationship among the various layers of the Linux-based memory system may be seen in FIGS. 16-20.

The interaction process may include one or more of the following. For example, when the host initiates a random read and write of a data page, or a sequential read and write of a log file, the host's processor may pass the I/O requests generated by the APP to the VFS layer of the Linux operating system. The function of the VFS layer is to perform I/O operations on the files in the selected directory according to the processor of the host, and to pass the I/O request to the file system. For example, in Linux, files in some directories (e.g., such as/AA1/AA2) may be managed by the NFS file system, and files in some other directories (e.g., such as/AA3/AA4) may be managed by the Ext3 file system. At this point, the VFS layer may determine the read and write I/O requests initiated for files under the selected directory (e.g., the selected directory is/AA1/AA2), and transfer the request to the corresponding file system (e.g., such as NFS), as shown in FIG. 16.

Figure 17:
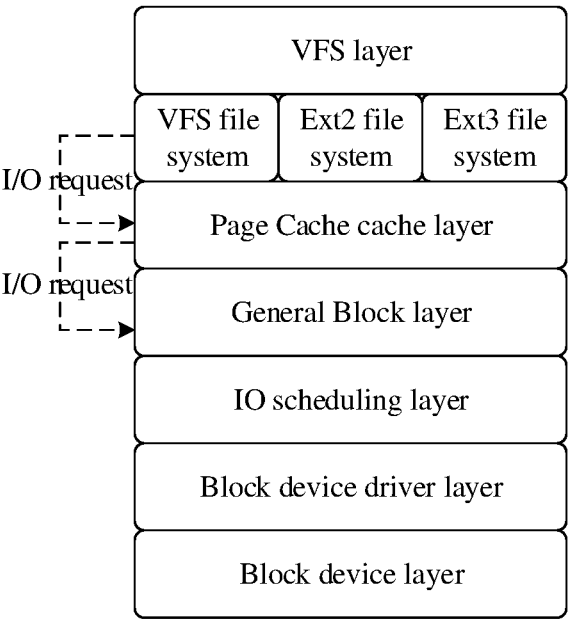

Then, the file system may search for the required data in Page Cache, which is a memory-based cache (e.g., cache layer of Page Cache). If data is found, reading and writing operation(s) may be performed based on the memory cache. Conversely, if data is not found, the file system may search the next layer. At this point, the I/O request may be passed to the general Block layer, and the I/O request for the file may be converted into a Block I/O request at this layer, as shown in FIG. 17.

Figure 18:
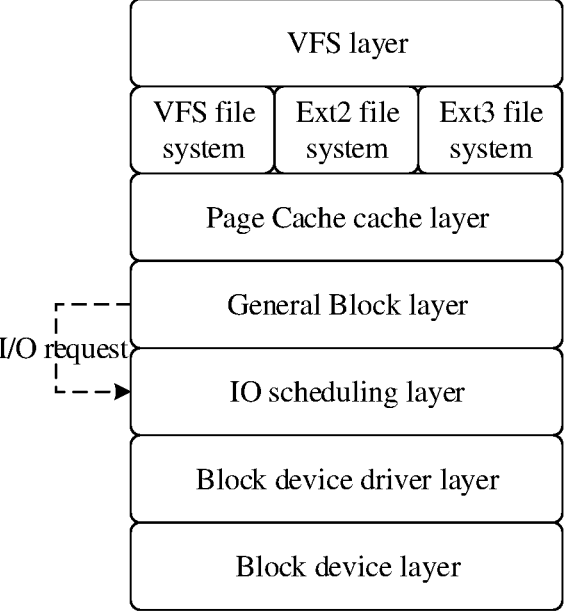

After the I/O request is converted into a Block I/O request, the Block I/O request may be passed to the I/O scheduling layer, as shown in FIG. 18. The function of this layer is to rank a plurality of Block I/O requests and determine the order in which each of Block I/O requests is sent. The adopted scheduling algorithm may include a Completely Fair Scheduler (CFQ) algorithm or a deadline I/O scheduling algorithm.

Figures 19, 20:
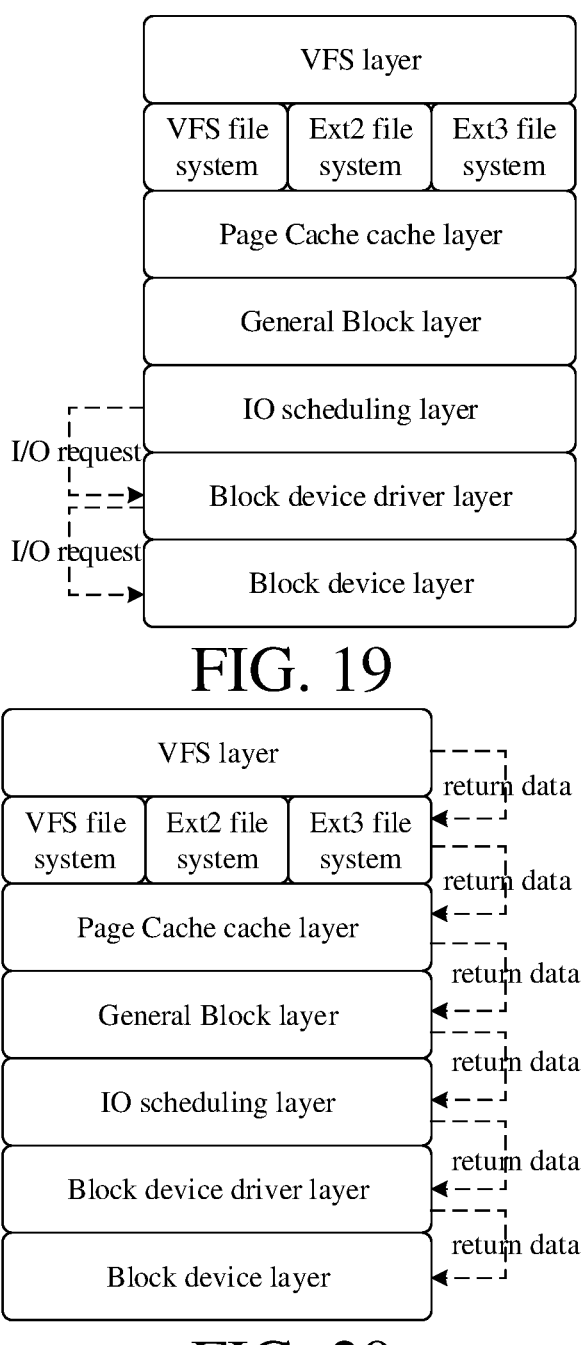

Finally, after the I/O request is scheduled, the file system may decide which Block I/O request to execute first and which Block I/O request to execute later. Then, the Block I/O request for execution may be passed to the Block device driver layer (on which device driver running). Then, the I/O request may be converted into one or more request commands through the Block device driver layer, and sent to the real memory hardware (memory device), e.g., the Block device layer, as shown in FIG. 19.

Then, after the memory device completes the I/O read operation and write operation (it is either a write operation or a read operation), and returns the response through the above layers in reverse order. Finally, the host may obtain the result of this I/O read and write operation, as shown in FIG. 20.

In some examples, the I/O request may be (referring to a read request) a data memory (or write) request, or a data drop request.

Figure 21:
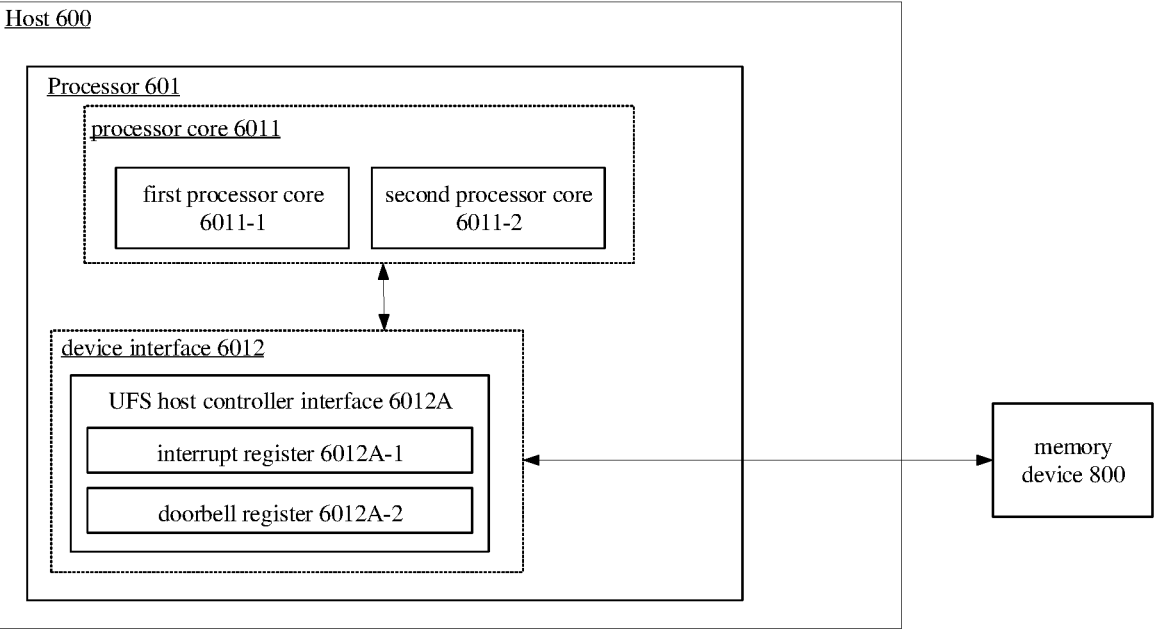
FIG. 21 shows a second structural schematic diagram of a host provided by an example of the present disclosure, according to some implementations of the present disclosure.

In some examples, as shown in FIG. 21, the processor 601 may further include a device interface 6012. The device interface may include Host Controller Interface (HCI) 6012A, and the host controller interface may include an interrupt register 6012A-1.

The second CPU core 6011-2 may be further configured to, in response to the control of the second thread, poll the interrupt register to receive the feedback information.

In some examples, the second CPU core 6011-2 may be configured to, in response to the control of the second thread, periodically access the interrupt register at a preset time interval to determine whether the feedback information is received in the interrupt register. If the feedback information is received, the second CPU core 6011-2 may be configured to obtain the feedback information from the interrupt register.

It is to be noted that, the foregoing description relates to some operations of the second CPU core when the second thread runs. When the second thread is the receiving kernel thread, the second CPU core may poll the interrupt register included in the HCI in response to the control of the second thread, so as to receive the aforementioned feedback information related to the I/O request. Here, the feedback information may refer to returned data, as shown in FIG. 20.

The process of polling the interrupt register by the second CPU core in response to the control of the second thread may include periodically accessing the interrupt register at a preset time interval. Here, the preset time interval may be set according to actual conditions.

The present disclosure adopts a polling strategy for receiving feedback information, so that the entire process of receiving feedback information may be processed in one thread. This compared with the interrupt-handling mechanism described above, eliminates a large amount of overhead caused by interrupt-context switching in the interrupt-handling mechanism.

Figure 22:
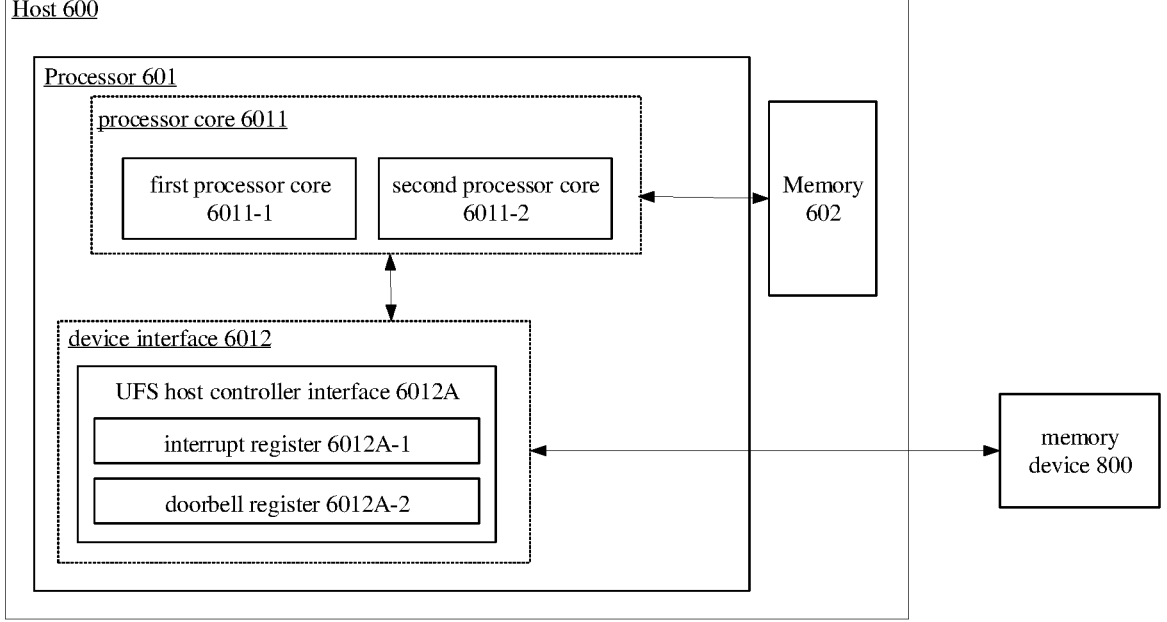
FIG. 22 shows a third structural schematic diagram of a host provided by an example of the present disclosure, according to some implementations of the present disclosure.

In some examples, as shown in FIG. 22, the host 60 may further include a memory 602. The memory 602 may be configured to store a request command queue. The request command queue may include one or more request commands, and the one or more request commands correspond to one or more I/O requests.

The first CPU core 6011-1 may be configured to, in response to the control of the first thread, obtain the one or more request commands from the request command queue, and send the one or more request commands to the memory device.

It is to be noted that it has been described above that one or more request commands are formed after the I/O request being converted by the device driver, and these request commands are stored in the memory in the form of a queue to form a request command queue. The request command queue may be a sequential queue or a linked list queue, where the sequential queue adopts the first-in-first-out constraint; and the linked list queue may adopt the first-in-first-out constraint, and may also adopt other constraints, e.g., such as first-in-last-out, etc.

In some examples, the present disclosure only illustrates the function of the request command queue and how to use it by taking the queue with the first-in-first-out constraint as a non-limiting example. That is, the first CPU core 6011-1 obtains the request commands from the memory, according to the sequence in which the request commands are stored, and sends the request commands. Here, the memory 602 may be the same as the aforementioned memory 304, which may include program memory, data memory, write buffer/cache, read buffer/cache, data buffer/cache, and mapping buffer/cache for storing write data and read data. The memory 602 may be implemented with a volatile memory. The memory 602 may be implemented with SRAM, DRAM, or both.

In some examples, as shown in diagrams 21 and 22, the host controller interface 6012A may further include a doorbell register 6012A-2. The second CPU core 6011-2 may be further configured to access the doorbell register to determine the I/O request corresponding to the feedback information.

In some examples, the first CPU core may be further configured to access the doorbell register, and assign a transmission channel required for the I/O request in a ready state.

It is to be noted that here, the doorbell register may also be referred as a "Doorbell register." The Doorbell register provides a request command distribution channel for a plurality of CPU cores (e.g., including the transmission channel of the request command from the host side to the memory device side), and each of CPU cores may send request commands to the memory device through the Doorbell register, or receive the feedback information of the request command through the Doorbell register and determine the I/O request corresponding to the received feedback information. That is to say, both of the first CPU core and the second CPU core may access the Doorbell register to obtain the transmission channel of the data or obtain the source of the data.

By way of example and not limitation, for doorbell register access, the access mode for the doorbell register includes a locked access mode. The locked access mode includes that the doorbell register is only accessed by the first CPU core or the second CPU core at a same time.

That is, the Doorbell register is only accessed by the first CPU core or the second CPU core at the same time. Taking the first CPU core as an example, when the first CPU core sends a request command through the Doorbell register, the Doorbell register will be locked, and at this point, the second CPU core may not be able to access the Doorbell register.

In some examples, the Doorbell register may include 32 bits, and each of bits represents a distribution channel for the host to send an I/O request to the memory device. In some examples, the bit corresponding to the used distribution channel in the Doorbell register will be set to 1, and the rest of the bits will remain as 0. Based on this, the first CPU core described in this disclosure accesses the doorbell register, and the process of assigning the transmission channel required for the I/O request in the ready state may be performed as follows. For instance, the first CPU core traverses the 32 distribution channels (also transmission channels) included in the Doorbell register, and from which it may determine a distribution channel that is not occupied by other CPU cores. The flag bit related to the unoccupied distribution channel may be 0. The flag related to the occupied distribution channel may be 1. The first CPU core sets the identification bit of the selected unoccupied distribution channel from 0 to 1, thereby indicating that the distribution channel is occupied. The first CPU core sends the request command to the memory device through the distribution channel. After finishing sending the request command, the first CPU core unlocks the Doorbell register, so that other CPU cores (such as the second CPU core) may also access the Doorbell register.

The process described in this disclosure that the second CPU core 6011-2 accesses the doorbell register to determine the I/O request corresponding to the feedback information may be performed as follows. For example, the current value of the Doorbell register and be read and compared with the uncompleted command list previously issued by the host. Here each of the bits in the Doorbell register being 0 means that the request command has been completed, and each of bits in the Doorbell register being 1 means that the request command has not been completed. Since the Doorbell register is accessed with a lock, only one bit in the Doorbell register is 1 each time a request command is sent, thus the I/O request corresponding to the feedback information may be determined.

Figure 23:
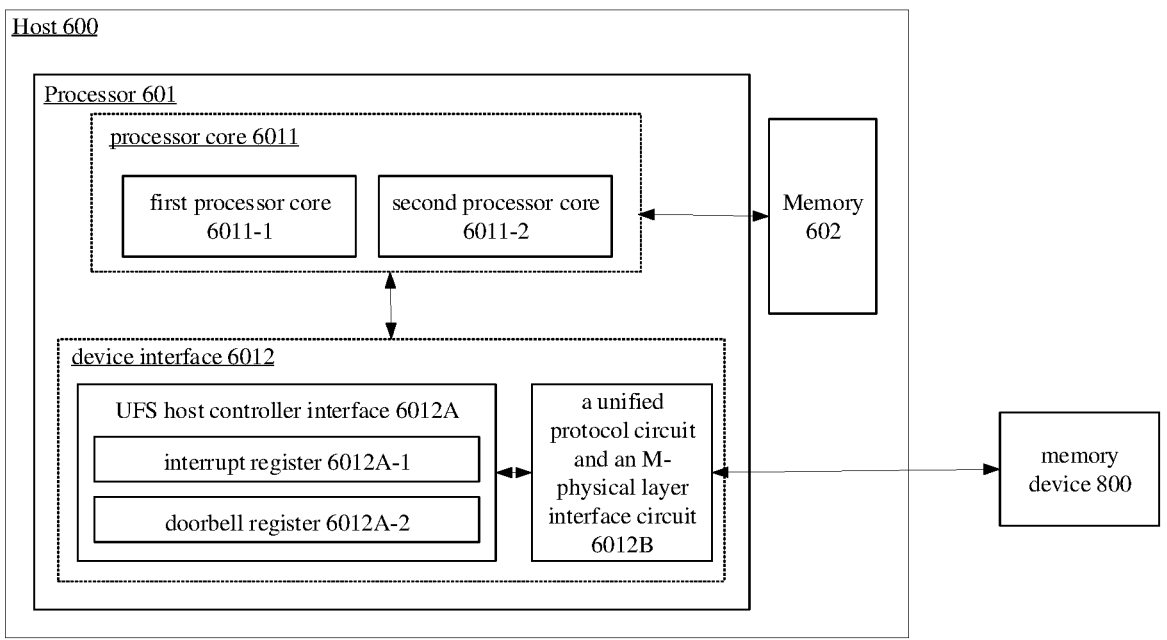
FIG. 23 shows a fourth structural schematic diagram of a host provided by an example of the present disclosure, according to some implementations of the present disclosure.

In some examples, as shown in FIG. 23, the device interface may include a unified protocol circuit and an M-physical layer interface circuit 6012B. The unified protocol circuit and the M-physical layer interface circuit may be coupled with the host controller interface. One or more of the unified protocol circuit and/or the M-physical layer interface circuit may be configured to send a request command to the memory device or receive the feedback information sent by the memory device. The request command may be generated based on the I/O request.

It is to be noted that the mentioned Unified Protocol (UniPro) circuit and M-physical layer (M-PHY) circuit 6012B may be the host-side UFS Inter Connect (UIC) layer, which is an interface through which the host is directly connected to the memory device. The implementation of the UniPro circuit and the M-PHY circuit may refer to the UniPro protocol and the M-PHY protocol, which will not be repeated here.

Figure 24:
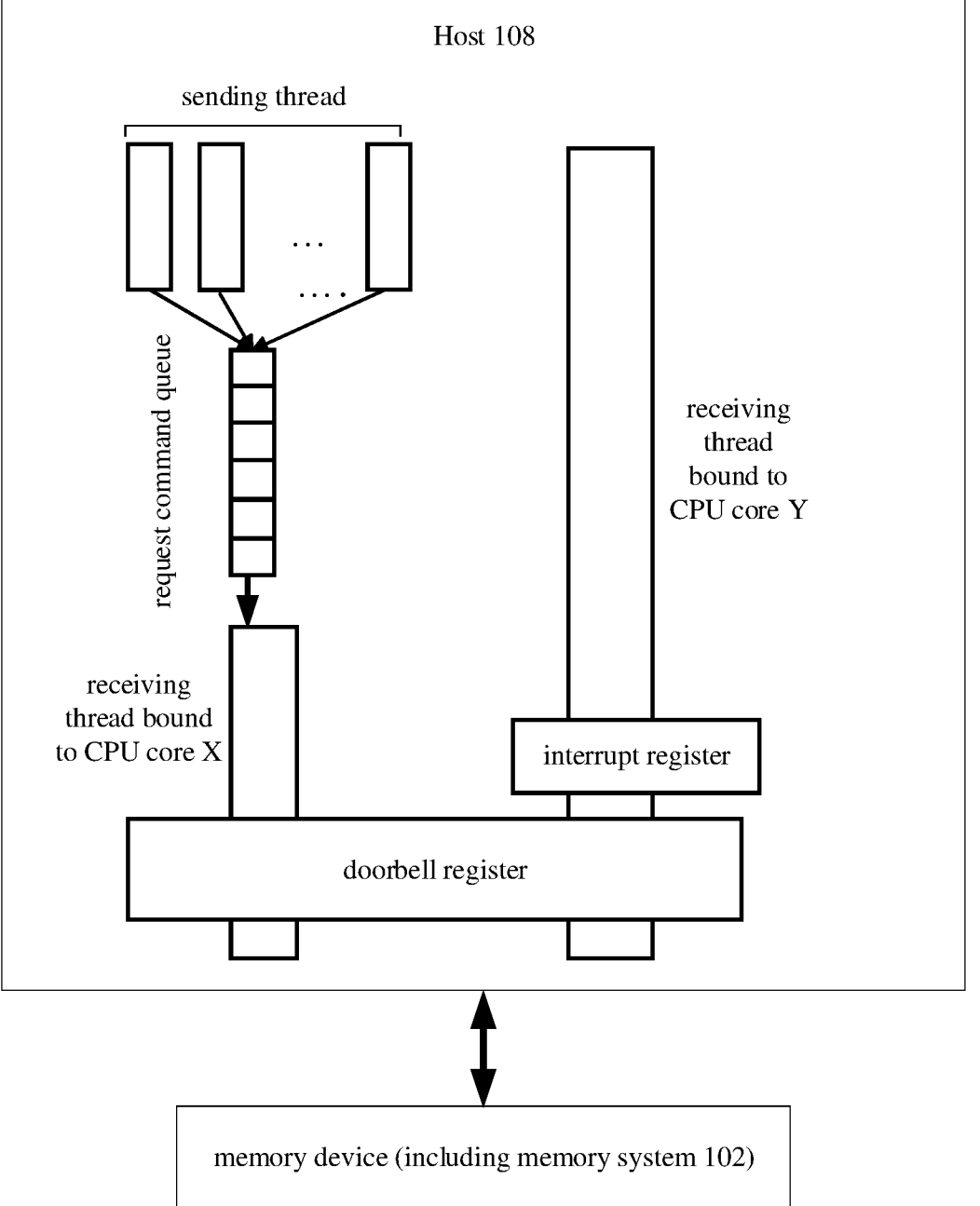
FIG. 24 shows a schematic flowchart of a host sending an I/O request to a memory device and receiving feedback information provided by an example of the present disclosure, according to some implementations of the present disclosure.

Referring to FIG. 24, a schematic flowchart of a host sending an I/O request to a memory device and receiving feedback information is shown. In FIG. 24, the sending thread is bound to CPU core X and the receiving thread is bound to CPU core Y. When the host sends a request command to the memory device, the request command may be obtained from the request command queue stored in the memory in a first-in first-out manner by the sending thread on the CPU core X, and the obtained request command is sent to the memory device. When the host receives the feedback information sent by the memory device, the interrupt register may be accessed in a polling manner by the receiving thread on the CPU core Y, and the feedback information may be processed when the interrupt register receives the feedback information. That is, processing the I/O requests between the host and the memory device with two dedicated CPU cores reduces a large amount of lock overhead.

Based on the same concept, an example of the present disclosure also provides an information processing method for a host, as shown in FIG. 25. The information processing method for the host may include, e.g., operations S2501 and S2502.

Referring to FIG. 25, at operation S2501, the method may include binding a first thread to a first CPU core included in the host.

At operation S2502, the method may include binding a second thread to a second CPU core included in the host. In some implementations, when the first thread runs, the method may include controlling the first CPU core to send an I/O request to the memory device coupled to the host; and when the second thread runs, the method may include controlling the second CPU core to receive feedback information which is related to the I/O request and sent by the memory device.

In some examples, when the second thread runs, the controlling the second CPU core to receive the feedback information which is related to the I/O request and sent by the memory device may include controlling the second CPU core to poll an interrupt register included in the host to receive the feedback information.

In some examples, the controlling the second CPU core to poll an interrupt register included in the host to receive the feedback information may include periodically accessing the interrupt register at a preset time interval to determine whether the feedback information is received in the interrupt register; if the feedback information is received, the method may include obtaining the feedback information from the interrupt register.

In some examples, when the first thread runs, the controlling the first CPU core to send an I/O request to a memory device coupled to the host may include controlling the first CPU core to obtain one or more request commands from the request command queue stored in the memory of the host, and sending the one or more request commands to the memory device. The one or more request commands correspond to one or more I/O requests.

In some examples, the method may further include, when the first thread runs, controlling the first CPU core to access the doorbell register included in the host, and assigning the transmission channel required for the I/O request in a ready state. In some examples, the method may further include, when the second thread runs, controlling the second CPU core to access the doorbell register to determine the I/O request corresponding to the feedback information.

In some examples, the access mode for the doorbell register may include a locked access mode. The locked access mode may include that the doorbell register is only accessed by the first CPU core or the second CPU core at a same time.

It is to be noted that the information processing method for the host provided by the example of the present disclosure belongs to the same concept as the host provided above. The implementation of each of operations described here has been described in detail above, and may be understood by referring to the above description, and will not be repeated here.

Referring to FIG. 26, an electronic system 2600 is shown. Electronic system 2600 may include a host 2601. The host 2601 may include a processor. The processor may be configured to bind a first thread to a first CPU core included in the processor. The processor may be configured to bind a second thread to a second CPU core included in the processor. The processor may be configured to run the first thread, such that the first CPU core is controlled to send an I/O request to a memory device. Electronic device 2600 may include a memory device 2602 coupled to the host. The memory device 2602 may be configured to receive and process the I/O request. The memory device 2602 may be configured to generate feedback information related to the I/O request. The memory device 2602 may be configured to send the feedback information to the host.

The processor may be further configured to run the second thread, such that the second CPU core is controlled to receive the feedback information sent by the memory device. In some examples, the processor may further include a device interface. The device interface may include a host controller interface. The host controller interface may include an interrupt register. The second CPU core may be further configured to, in response to the control of the second thread, periodically send a first access command to the interrupt register at a preset time interval. The interrupt register is configured to, in response to the first access command, when receiving the feedback information sent by the memory device, send the feedback information to the second CPU core. In some examples, the host may further include a memory. The memory may be configured to store a request command queue. The request command queue may include one or more request commands. The one or more request commands may correspond to one or more I/O requests. The first CPU core may be further configured to, in response to the control of the first thread, send a second access command to the memory. The memory may be configured to, in response to the second access command, obtain the one or more request commands from the request command queue, and send the one or more request commands to the first CPU core. The first CPU core may be further configured to send the one or more request commands to the memory device.

It is to be noted that the "first" and "second" in the first access command and the second access command here are only for the purpose of easily describing access commands in different processes, and are not used for quantitative limitation. That is: the first access command is an access command sent by the second CPU core when accessing the interrupt register; the second access command is an access command sent by the first CPU core when accessing the memory. An electronic system provided by an example of the present disclosure includes the host provided above, and the description of the host may refer to the foregoing description of the host for, which will not be repeated here. The memory device includes a memory system as shown in FIGS. 1 to 5 above, which will not be repeated here.

An example of the present disclosure also provides a computer-readable memory medium, in which a computer program is stored, and when executed by a processor, the computer program implements operations of the method according to any one of the foregoing. The aforementioned memory media include: various media capable of storing program codes such as removable memory devices, Read-Only Memory (ROM), Random Access Memory (RAM), magnetic disk or optical disk, etc.

It is to be noted that, in the several examples provided in the present disclosure, it should be understood that the disclosed devices and methods may be implemented in other ways. The device examples described above are only illustrative, e.g., the division of the elements is only a logical function division, and in actual implementation, there may be other division methods, such as a plurality of elements or components may be combined, or may be integrated into another system, or some features may be ignored, or not implemented. In addition, the coupling, or direct coupling, or communication connection between the components shown or discussed may be indirect coupling or communication connection of devices or elements through some interfaces, and may be electrical, mechanical or in other forms.

The elements described above as separate parts may or may not be physically separated, and the parts displayed as elements may or may not be physical elements, i.e., they may be located in one place or distributed to a plurality of network elements; and portions or all of these elements may be selected according to actual needs to achieve the purpose of the solution of this example.

In addition, each functional unit in each example of the present disclosure may be integrated into one processing unit, or each unit may be used as a single unit, or two or more units may be integrated into one unit; the integrated units described above may be implemented in the form of hardware, or in the form of hardware plus software functional units.

Those of ordinary skill in the art may understand that all or portions of the operations to implement the method examples described above may be completed by hardware related to program instructions, and the aforementioned program may be stored in a computer-readable memory medium, the program, when is executed, performs the operations including the method examples described above; and the aforementioned memory media include: various media capable of storing program codes such as removable memory devices, Read-Only Memory (ROM), Random Access Memory (RAM), magnetic disk or optical disk, etc.

Alternatively, if the above-mentioned integrated units of the present disclosure are implemented in the form of software function modules and sold or used as independent products, they may also be stored in a computer-readable memory medium. Based on this understanding, the essence of technical solutions of the examples of the present disclosure or the part that contributes to the prior art may be embodied in the form of a software product, which is stored in a memory medium, and includes several instructions to enable a computer device (which may be a personal computer, server, or network device, etc.) to execute all or part of the methods described in various examples of the present disclosure. The aforementioned memory media include: various media capable of storing program codes such as removable memory devices, ROM, RAM, magnetic disk or optical disk, etc.

The above is only specific implementations of the present disclosure, but the claimed scope of the present disclosure is not limited thereto, and changes or substitutions within the technical scope disclosed in the present disclosure that may be easily conceived by those skilled in the art shall fall within the claimed scope of the present disclosure. Therefore, the claimed scope of the present disclosure should be determined by the claimed scope of the claims.

What is claimed is:

1. A host, comprising:
a processor, comprising:
    a doorbell register comprising a plurality of distribution channels;
    a first central processing unit (CPU) core bound with a first thread and configured to:
        in response to control of the first thread, determine a distribution channel from among the plurality of distribution channels of the doorbell register as unoccupied based an identification bit corresponding to the distribution channel having a first value;
change the identification bit corresponding to the distribution channel from the first value to a second value to indicate the distribution channel is occupied; and
send an input/output (I/O) request to a memory device coupled to the host via the distribution channel, wherein the first thread comprises a sending kernel thread of a kernel space; and
a second CPU core bound with a second thread and configured to:
    in response to control of the second thread, receive feedback information which is related to the I/O request and sent by the memory device, wherein the second thread is a receiving kernel thread of a kernel space.

2. The host of claim 1, wherein:
the processor further comprises:
a device interface, comprising:
    a host controller interface, comprising:
        an interrupt register, and
        the second CPU core is further configured to, in response to the control of the second thread, poll the interrupt register to receive the feedback information.

3. The host of claim 2, wherein the second CPU core is configured to:
in response to the control of the second thread, periodically access the interrupt register at a preset time interval to determine whether the feedback information is received in the interrupt register; and
if the feedback information is received, obtain the feedback information from the interrupt register.

4. The host of claim 1, further comprising:
a memory configured to:
store a request command queue which includes one or more request commands corresponding to one or more I/O requests,
wherein the first CPU core is configured to:
    in response to the control of the first thread, obtain the one or more request commands from the request command queue; and
    send the one or more request commands to the memory device.

5. The host of claim 2, wherein:
the host controller interface further comprises:
the doorbell register, and
the second CPU core is further configured to:
access the doorbell register to determine the I/O request corresponding to the feedback information.

6. The host of claim 5, wherein the first CPU core is further configured to:
access the doorbell register.

7. The host of claim 6, wherein:
an access mode for the doorbell register includes a locked access mode, and
the locked access mode includes that the doorbell register is only accessed by the first CPU core or the second CPU core at a same time.

8. The host of claim 1, wherein the I/O request is generated by an application running on the processor, and the I/O request is converted by a device driver running on the processor into one or more request commands in a format supported by the memory device.

9. The host of claim 2, wherein the device interface further includes:

a unified protocol circuit and an M-physical layer interface circuit, which are coupled with the host controller interface, one or more of the unified protocol circuit or the M-physical layer interface circuit being configured to:

send a request command to the memory device; or receive the feedback information sent by the memory device, wherein the request command is generated based on the I/O request.

10. The host of claim 1, wherein the memory device includes a Universal Flash Memory (UFS) device.

11. The host of claim 1, wherein an operating system running on the host includes a Linux operating system.

12. The host of claim 1, wherein:

the processor includes a plurality of CPU cores, the first CPU core is any one of the plurality of CPU cores, and the second CPU core is any one of the plurality of CPU cores other than the first CPU core.

13. A method of information processing for a host, comprising:

binding a first thread to a first central processing unit (CPU) core included in the host, the first thread being a sending kernel thread of a kerel space; and binding a second thread to a second CPU core included in the host, the second thread being a receiving kernel thread of a kernel space, wherein when the first thread runs, controlling the first CPU core to determine a distribution channel from among a plurality of distribution channels of a doorbell register as unoccupied based an identification bit corresponding to the distribution channel having a first value;

controlling the first CPU core to change the identification bit corresponding to the distribution channel from the first value to a second value to indicate the distribution channel is occupied; and controlling the first CPU core to send an input/output (I/O) request to a memory device coupled to the host via the distribution channel, and wherein when the second thread runs, controlling the second CPU core to receive feedback information which is related to the I/O request and sent by the memory device.

14. The method of claim 13, wherein when the second thread runs, the controlling the second CPU core to receive feedback information which is related to the I/O request and sent by the memory device comprises:

controlling the second CPU core to poll an interrupt register included in the host to receive the feedback information.

15. The method of claim 14, wherein the controlling the second CPU core to poll the interrupt register included in the host to receive the feedback information comprises:

periodically accessing the interrupt register at a preset time interval to determine whether the feedback information is received in the interrupt register; and if the feedback information is received, obtaining the feedback information from the interrupt register.

16. The method of claim 13, wherein when the first thread runs, the controlling the first CPU core to send an input/output (I/O) request to a memory device coupled to the host comprises:

controlling the first CPU core to obtain one or more request commands from a request command queue stored in a memory of the host; and sending the one or more request commands to the memory device, the one or more request commands corresponding to one or more I/O requests.

17. The method of claim 14, further including:

when the first thread runs, controlling the first CPU core to access a doorbell register included in the host, and assigning a transmission channel required for the I/O request in a ready state; and when the second thread runs, controlling the second CPU core to access the doorbell register to determine the I/O request corresponding to the feedback information.

18. The method of claim 17, wherein an access mode for the doorbell register includes a locked access mode, wherein the locked access mode includes that the doorbell register is only accessed by the first CPU core or the second CPU core at a same time.

19. An electronic system, comprising:

a host; and a memory device coupled to the host, wherein the host comprises:

a processor configured to:

bind a first thread to a first central processing unit (CPU) core included in the processor, wherein the first thread is a sending kernel thread of a kernel space;

bind a second thread to a second CPU core included in the processor, wherein the second thread is a receiving kernel thread of a kernel space; and run the first thread, such that the first CPU core is controlled to determine a distribution channel from among a plurality of distribution channels of a doorbell register as unoccupied based an identification bit corresponding to the distribution channel having a first value, change the identification bit corresponding to the distribution channel from the first value to a second value to indicate the distribution channel is occupied, and send an input/output (I/O) request to a memory device coupled to the host via the distribution channel; and wherein the memory device is configured to:

receive and process the I/O request;

generate feedback information related to the I/O request; and send the feedback information to the host, wherein the processor is further configured to:

run the second thread, such that the second CPU core is controlled to receive the feedback information sent by the memory device.

20. The electronic system of claim 19, wherein:

the processor further comprises:

a device interface, comprising:

a host controller interface, comprising:

an interrupt register, the second CPU core is further configured to:

in response to controlling the second thread, periodically send a first access command to the interrupt register at a preset time interval, and the interrupt register is configured to:

in response to the first access command, send the
   feedback information to the second CPU core upon
   receipt of the feedback information sent by the
   memory device.

* * * * *